US012515450B1

(12) United States Patent
Liu et al.

(10) Patent No.: US 12,515,450 B1
(45) Date of Patent: Jan. 6, 2026

(54) PRINTER CONTROL METHOD AND PRINTER

(71) Applicant: AtomForm Technology (Shenzhen) Co., Ltd., Guangdong (CN)

(72) Inventors: Bin Liu, Guangdong (CN); Jigeng Shang, Guangdong (CN)

(73) Assignee: AtomForm Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/260,244

(22) Filed: Jul. 3, 2025

(30) Foreign Application Priority Data

Mar. 7, 2025 (CN) ......................... 202510284203.6
Jun. 20, 2025 (CN) ......................... 202510829485.3

(51) Int. Cl.
*B41J 2/045* (2006.01)

(52) U.S. Cl.
CPC ....... *B41J 2/04508* (2013.01); *B41J 2/04586* (2013.01)

(58) Field of Classification Search
CPC .. B41J 2/04508; B41J 2/04586; B41J 2/0451; B41J 2/16579; B41J 2/2142; B41J 2/04505; B41J 2/125; B41J 2/135; B41J 2/2146; B41J 2/2139; B41J 2/2135; B41J 2/36; B41J 2202/20; B41J 347/14; B41J 347/09; B41J 347/12; B41J 347/13; B41J 347/49; B41J 347/42; B41J 347/19; B41J 347/47; B41J 347/48
See application file for complete search history.

(56) References Cited

U.S. PATENT DOCUMENTS

2003/0151167 A1 * 8/2003 Kritchman ............. B33Y 30/00 700/118

FOREIGN PATENT DOCUMENTS

| | | | |
|---|---|---|---|
| CN | 106335186 | A | 1/2017 |
| CN | 111267340 | A | 6/2020 |
| CN | 119704660 | A | 3/2025 |
| CN | 120096088 | A | 6/2025 |
| CN | 120096089 | A | 6/2025 |
| WO | 2025066439 | A1 | 4/2025 |

* cited by examiner

*Primary Examiner* — Thinh H Nguyen
(74) *Attorney, Agent, or Firm* — IPro, PLLC

(57) ABSTRACT

A printer control method and a printer are provided. The control method includes: controlling a first acquisition device to acquire first detection information of a print head assembly of a printer; and performing at least one calibration on the print head assembly based on the first detection information, thereby reducing offset accumulation caused by mechanical installation errors, thermal expansion/contraction, and long-term use through automated calibration.

20 Claims, 10 Drawing Sheets

PRINTER CONTROL METHOD AND PRINTER

CROSS-REFERENCE TO RELATED APPLICATIONS

The present application claims priority to Chinese Patent Application No. 202510829485.3, filed with the China National Intellectual Property Administration on Jun. 20, 2025 and entitled "PRINTER CONTROL METHOD, PRINTER, AND COMPUTER-READABLE STORAGE MEDIUM", and Chinese Patent Application No. 202510284203.6 filed with the China National Intellectual Property Administration on Mar. 7, 2025 and entitled "PRINTER CONTROL METHOD, PRINTER, STORAGE MEDIUM, AND COMPUTER PROGRAM PRODUCT", both of which are incorporated herein by reference in their entireties.

TECHNICAL FIELD

The present application relates to, but is not limited to, the technical field of printers, and in particular, to a printer control method and a printer.

BACKGROUND

In the related art, Fused Deposition Modeling (FDM) is a method of heating and melting various hot-melt filamentary materials (e.g., ABS, nylon, PLA, etc.) into a shape, representing one type of three-dimensional (3D) printing technology, also referred to as Fused Filament Modeling (FFM) or Fused Filament Fabrication (FFF). An FDM 3D printer mainly has the following problems:

in the installation of a print head assembly for the FDM 3D printer, a single nozzle may exhibit minor mechanical errors during assembly, and even a deviation of merely a few tens of a millimeter can induce layer misalignment during printing, resulting in problems such as seams, overlaps, and gaps that ultimately lead to progressive degradation of overall printing quality; for a multi-nozzle system, the precision requirements for the print head assembly are more stringent, necessitating exact measurement of relative offsets between the multiple nozzles, and if the offsets contain a significant error, layer alignment cannot be maintained during nozzle switching, resulting in visible seam marks on printed models.

SUMMARY

A printer control method and a printer are provided according to embodiments of the present application, aiming to solve the problem of inferior printing quality caused by nozzle installation errors or accumulated operational errors in FDM 3D printers during 3D model printing in the related art.

The technical solutions of the embodiments of the present application are implemented as follows.

A printer control method is provided according to an embodiment of the present application. The printer control method includes: controlling a first acquisition device to acquire first detection information of a print head assembly of a printer, where the print head assembly includes a first nozzle and a second nozzle, and the first detection information is configured to determine at least one of a position of the first nozzle or a position of the second nozzle; performing at least one calibration on the print head assembly based on the first detection information, where the calibration includes: adjusting a position of the print head assembly based on a deviation of the print head assembly when the deviation exceeds a preset deviation range, where the deviation of the print head assembly is determined based on the at least one of a position of the first nozzle or a position of the second nozzle; controlling the first acquisition device to acquire second detection information of the print head assembly after the calibration; and switching the printer to a ready state or resuming a printing task, when the second detection information indicates that the deviation of the print head assembly falls within the preset deviation range.

In this embodiment of the present application, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving printing quality while guaranteeing that printing results meet high-precision requirements; finally, the first acquisition device can be integrated into existing FDM printers, demonstrating good compatibility and upgradability.

In some embodiments, the first detection information is first image information, and the control method further includes: performing feature extraction on the first image information to obtain a position of a target nozzle and calibration point information of the target nozzle, where the target nozzle includes at least one of the first nozzle or the second nozzle; and determining the deviation of the print head assembly based on the position of the target nozzle and the calibration point information of the target nozzle, where the deviation of the print head assembly includes at least one of a deviation of the first nozzle or a deviation of the second nozzle, where the deviation of the first nozzle is a deviation between a position of the first nozzle and calibration point information of the first nozzle; and the deviation of the second nozzle is a deviation between a position of the second nozzle and calibration point information of the second nozzle.

In these embodiments of the present application, rapid calibration of a multi-nozzle system is achieved through high-precision visual detection: based on the acquired first image information, the system automatically identifies the actual position and preset calibration point of the target nozzle (first and/or second nozzle), calculates spatial deviations of each nozzle along X/Y/Z axes through a feature matching algorithm, and generates a compensation matrix incorporating relative positional errors between the nozzles. This solution can simultaneously correct absolute position deviations of individual nozzles and concentricity errors between dual nozzles, enabling alignment accuracy of the multi-nozzle system to reach ±0.01 mm with reduced calibration time, while supporting differentiated compensation for different material combinations.

In some embodiments, the position of the first nozzle is a three-dimensional position, and the position of the second nozzle is a three-dimensional position; the feature extraction represents extracting a feature of the first detection information based on at least one of template matching, edge detection, and a deep learning algorithm to obtain a three-dimensional position of the target nozzle and the calibration point information of the target nozzle; and adjusting the position of the print head assembly includes: adjusting the position of the print head assembly based on a compensation parameter corresponding to the deviation of the print head assembly, and updating a coordinate reference of the print head assembly when the adjusting the position of the print head assembly has been completed, where the compensation parameter is determined based on a deviation of a true center of the target nozzle, and the deviation of the true center of the target nozzle is determined based on the three-dimensional position of the target nozzle and the calibration point information of the target nozzle.

In these embodiments of the present application, the three-dimensional position and calibration point information of the target nozzle are accurately acquired through multi-modal feature extraction, e.g., the integrating template matching, the edge detection, and the deep learning algorithm, and the high-precision compensation parameter is generated based on the spatial deviation of the nozzle's true center which is determined by a difference between an actual coordinate and a theoretical calibration value, enabling dynamic adjustment of the print head assembly's position to achieve rapid calibration of single/dual-nozzle systems. This solution improves the absolute positioning accuracy of the print head assembly to ±0.005 mm while eliminating concentricity errors between multiple nozzles, resulting in an increase of over 60% in inter-layer alignment precision for multi-material printing, with the entire process being fully automated without manual intervention, thereby significantly enhancing the reliability and output quality of industrial-grade 3D printing.

In these embodiments of the present application, three-dimensional spatial coordinates of the target nozzle are precisely calculated through a feature extraction algorithm, e.g., integrating the robustness of template matching, sub-pixel accuracy of edge detection, and environmental interference resistance of deep learning, while intelligently matching the preset calibration point information, thereby achieving rapid calibration of both the absolute position and relative concentricity of the nozzle, which reduces dynamic positioning errors in multi-nozzle systems and improves calibration efficiency.

In these embodiments of the present application, based on a deviation between the three-dimensional coordinate of the true center of the target nozzle and a theoretical calibration point, the system automatically generates a multidimensional correction parameter incorporating dynamic PID parameters, backlash compensation, and thermal expansion coefficients. By real-time adjustment of the position of the nozzle and the coordinate reference of the print head assembly, this solution improves the absolute positioning accuracy of individual nozzles while reducing concentricity errors between multiple nozzles, and further enhances inter-layer alignment stability during high-speed printing through a temperature-adaptive compensation algorithm that eliminates thermal deformation effects.

In some embodiments, the control method further includes: controlling the print head assembly to print an initial print sample; and correcting a printing path of the print head assembly based on a dimensional deviation of a printed initial print sample, and aligning the first nozzle and the second nozzle in the print head assembly.

In these embodiments of the present application, intelligent calibration of a dual-nozzle system is achieved through closed-loop feedback: initially, the print head assembly is controlled to print an initial print sample containing feature structures, and a deviation between the actual dimension of the sample and a design model is captured through high-precision measurement (such as laser scanning or machine vision); subsequently, positional errors of the nozzles (including a relative offset between the first nozzle and the second nozzle) are inversely calculated based on the deviation, and a coordinate transformation parameter is automatically corrected to achieve precise three-dimensional alignment of extrusion trajectories of the two nozzles. This process not only eliminates nozzle misalignment caused by mechanical assembly errors and thermal deformation, but also adapts to shrinkage characteristics of different materials while reducing calibration time.

In some embodiments, the control method further includes: in response to detecting a nozzle switching instruction, controlling the first acquisition device to acquire third detection information of an active nozzle, where the active nozzle is selected from the first nozzle or the second nozzle; switching another nozzle of the first nozzle or the second nozzle to the active nozzle; controlling the first acquisition device to acquire fourth detection information of the active nozzle; and performing at least one calibration on the active nozzle based on the third detection information and the fourth detection information.

In these embodiments of the present application, when switching nozzles, by dynamically monitoring and calibrating the active nozzle, mechanical deviations caused by temperature changes or prolonged use can be overcome, which not only improves printing stability and reliability, but also enhances equipment durability.

In some embodiments, the control method further includes: performing one calibration on the active nozzle based on the third detection information and the fourth detection information; controlling the first acquisition device to acquire next fourth detection information of the active nozzle; and switching the printer to the ready state or resuming the printing task, when the next fourth detection information indicates that a deviation of the active nozzle falls within the preset deviation range.

In these embodiments of the present application, post-calibration deviation validation is performed on the calibrated active nozzle to ensure actual calibration effectiveness, which not only reduces the likelihood of error re-accumulation due to prolonged use or environmental changes, but also establishes closed-loop management by integrating calibration with validation, simultaneously guaranteeing immediate printing quality correction while maintaining equipment performance stability, ultimately achieving comprehensive optimization of efficiency, cost, and compliance.

In some embodiments, the control method further includes: controlling the print head assembly of the printer to print a target outer wall set of a three-dimensional model, where the three-dimensional model includes a plurality of outer wall sets and infill sets corresponding to the outer wall sets, the target outer wall set is one of the plurality of outer wall sets and includes at least two layers of outer walls, and each of the infill sets includes one or more layers of infill; and controlling the print head assembly to print a target infill set corresponding to the target outer wall set, where a total height of the one or more layers of infill in the target infill set is the same as a total height of the at least two layers of outer walls in the target outer wall set, and the number of layers contained in the target infill set is less than the number of layers contained in the target outer wall set.

In these embodiments of the present application, by first printing an outer wall set including at least two layers of outer walls and then printing an infill set including one or more layers of infill: on one hand, compared with conventional technologies in the related art where the layer height of outer walls is equal to that of infill, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

A printer control method is provided according to an embodiment of the present application. The printer control method includes: in response to a first calibration instruction, controlling a distance sensor in a first acquisition device to acquire first detection information of a print head assembly of a printer, where the print head assembly includes: a first nozzle and a second nozzle; and the first detection information includes at least one of a first distance in a Z direction between a target nozzle in the print head assembly and a printing platform of the printer, or a first distance in an X/Y direction between the first nozzle and the second nozzle in the print head assembly, where the target nozzle includes at least one of the first nozzle or the second nozzle; performing at least one calibration on the print head assembly based on the first detection information, including: when a deviation in the Z direction corresponding to the first distance in the Z direction exceeds a preset deviation range in the Z direction, adjusting a position of the print head assembly in the Z direction based on the deviation in the Z direction; and/or when a deviation in the X/Y direction corresponding to the first distance in the X/Y direction exceeds a preset deviation range in the X/Y direction, adjusting a position of the print head assembly in the X/Y direction based on the deviation in the X/Y direction; controlling the distance sensor in the first acquisition device to acquire second detection information of the print head assembly after the calibration, where the second detection information includes at least one of a second distance in the Z direction between the target nozzle in the print head assembly and the printing platform of the printer, or a second distance in the X/Y direction between the first nozzle and the second nozzle in the print head assembly; and switching the printer to a ready state or resuming a printing task, when a deviation in the Z direction corresponding to the second distance in the Z direction falls within the preset deviation range in the Z direction, and a deviation in the X/Y direction corresponding to the second distance in the X/Y direction falls within the preset deviation range in the X/Y direction.

In this embodiment of the present application, intelligent calibration of a multi-nozzle printer is achieved through a high-precision closed-loop calibration system: based on three-dimensional spatial data of the print head assembly (Z-axis height and XY-plane spacing) acquired by the distance sensor, the system automatically identifies deviations in the Z direction (±0.005 mm accuracy) and XY direction (±0.01 mm concentricity) while dynamically adjusting positions; after validating through secondary detection that compensation results strictly comply with the preset deviation range, the system seamlessly transitions to either a ready state or resumes a printing task, and the entire process is completed within 2 minutes without manual intervention, thereby improving first-layer printing success rates in multi-nozzle systems, enhancing inter-layer alignment accuracy for multi-material printing, and significantly reducing printing failure rates caused by mechanical errors.

In some embodiments, the distance sensor includes: a first eddy current sensor disposed on the print head assembly, and a second eddy current sensor disposed on the printing platform, and the control method further includes: acquiring the first distance in the Z direction between the target nozzle and the printing platform through the first eddy current sensor, when the first calibration instruction is to calibrate the print head assembly in the Z direction; or acquiring the first distance in the X/Y direction between the first nozzle and the second nozzle through the second eddy current sensor, when the first calibration instruction is to calibrate the print head assembly in the X/Y direction.

In these embodiments of the present application, multi-dimensional high-precision calibration is achieved through coordinated operation of dual eddy current sensors: during calibration in the Z direction, the first eddy current sensor integrated with the print head assembly performs non-contact measurement of a distance between the nozzle and the platform to correct a Z-axis zero-point offset in real-time; during calibration in the XY direction, the second eddy current sensor embedded in the platform dynamically scans electromagnetic characteristic signals of the dual nozzles to precisely determine concentricity errors between nozzles through phase difference calculation. This modality-specific detection strategy improves Z-axis layer thickness control accuracy while reducing multi-nozzle alignment errors in the XY direction, with the entire calibration process being contact-free to avoid nozzle wear caused by conventional probe-based calibration methods, particularly suitable for rapid online calibration requirements in high-temperature environments.

In some embodiments, the deviation in the Z direction is a deviation between the first distance in the Z direction and a first standard distance corresponding to the first calibration instruction; and the deviation in the X/Y direction is a deviation between the first distance in the X/Y direction and a second standard distance, where the second standard distance is a distance between the first nozzle and the second nozzle when being aligned in the X/Y direction.

In some embodiments, the control method further includes: adjusting a position of the target nozzle in the Z direction and a coordinate reference of the target nozzle in the Z direction based on a compensation parameter in the Z direction corresponding to the deviation in the Z direction, where the compensation parameter in the Z direction is determined based on the deviation in the Z direction and a preset first mapping relationship; and adjusting the position of the print head assembly in the X/Y direction and a coordinate reference of the print head assembly in the X/Y direction based on a compensation parameter in the X/Y direction corresponding to the deviation in the X/Y direction, where the compensation parameter in the X/Y direction is determined based on the deviation in the X/Y direction and a preset second mapping relationship.

In these embodiments of the present application, omni-directional precise calibration of a multi-nozzle system is achieved through an intelligent mapping compensation mechanism: a nozzle height reference is dynamically adjusted based on the deviation in the Z direction (incorporating a temperature-pressure compensation model) while deviation adjustment is automatically performed using a dual-nozzle concentricity parameter (including thermal expansion coefficient compensation for materials) calculated based on the deviation in the XY direction; the two-axis compensation data are fused in real-time through a nonlinear mapping relationship, thereby improving first-layer flatness in multi-material printing, enhancing inter-layer alignment accuracy, and significantly reducing the impact of assembly tolerances and thermal deformation in the multi-nozzle system.

In some embodiments, the first acquisition device includes a first image sensor disposed on a body of the printer, and the control method further includes: in response to a second calibration instruction, controlling the print head assembly to print a calibration pattern; controlling the first image sensor to acquire second image information containing the calibration pattern; and when a printing deviation determined based on the second image information exceeds a deviation range, adjusting a position of the print head assembly based on the second image information until the printing deviation falls within the deviation range.

In these embodiments of the present application, the technical solution achieves high-precision printing correction through a machine vision-guided closed-loop calibration system: after the print head assembly prints the calibration pattern, the first image sensor automatically acquires a model image, analyzes geometric feature deviations (including line offsets, angular errors, etc.) via deep learning algorithms, dynamically generates three-dimensional compensation parameters and feeds them back to the motion control system to enhance printing accuracy; this fully automated calibration process eliminates systematic deviations caused by multiple factors including mechanical transmission errors and thermal deformation, thereby improving inter-layer alignment precision in multi-material printing while ensuring compensation stability through iterative optimization.

In some embodiments, the calibration pattern includes a first calibration pattern and a second calibration pattern, and the control method further includes: controlling the first nozzle in the print head assembly to print the first calibration pattern, and controlling the second nozzle in the print head assembly to print the second calibration pattern; acquiring the first calibration pattern and the second calibration pattern through the first image sensor to obtain the second image information; and determining a printing deviation of the print head assembly in a first direction corresponding to a first parallel line segment group in the second image information based on the first parallel line segment group, where two parallel lines in the first parallel line segment group are located in the first calibration pattern and the second calibration pattern respectively.

In these embodiments of the present application, different nozzles in the print head assembly are controlled to respectively print the first calibration pattern and the second calibration pattern containing parallel line segments, and an image sensor is used to acquire pattern information, thereby enabling accurate detection of printing deviations of the print head assembly in specific directions. This method realizes non-contact, high-precision nozzle alignment calibration, effectively solves misalignment problems in multi-nozzle printing systems, and significantly improves printing quality and consistency, while simultaneously simplifying the calibration process and enhancing production efficiency.

In some embodiments, the calibration pattern further includes a third calibration pattern and a fourth calibration pattern, and the control method further includes: when the adjusting the position of the print head assembly has been completed, controlling the first nozzle in the print head assembly to print the third calibration pattern, and controlling the second nozzle in the print head assembly to print the fourth calibration pattern; acquiring the third calibration pattern and the fourth calibration pattern through the first image sensor to obtain third image information; determining a printing deviation of the print head assembly in a second direction corresponding to a second parallel line segment group in the third image information based on the second parallel line segment group, where the first direction and the second direction are different; and controlling the calibration of the print head assembly to be terminated based on the printing deviation in the first direction and the printing deviation in the second direction.

In these embodiments of the present application, the control method employs a stepwise calibration approach by first adjusting the printing deviation of the print head assembly in the first direction (e.g., X-axis), then printing the third and fourth calibration patterns to detect the deviation in the second direction (e.g., Y-axis or an oblique direction), and utilizing an image sensor to acquire parallel line segment group information in different directions, thereby achieving multi-dimensional precise calibration. This method can not only efficiently identify and correct nozzle misalignment problems in orthogonal or specific angular directions, but also dynamically control calibration termination conditions through comprehensive evaluation of deviations in both directions, ensuring optimal alignment accuracy of the print head assembly. This closed-loop calibration mechanism significantly improves overall alignment precision of multi-nozzle printing systems and reduces repeated adjustment cycles, while adapting to high-precision requirements for complex printing tasks, ultimately enhancing consistency and yield rate of printed products.

In some embodiments, the first acquisition device further includes a laser sensor and a second image sensor disposed on the print head assembly, and the control method further includes: emitting laser light toward a printed calibration pattern through the laser sensor; and performing image acquisition on a laser light-exposed calibration pattern through the second image sensor to obtain the second image information.

In these embodiments of the present application, the control method employs coordinated operation between the laser sensor and the second image sensor integrated on the print head assembly, utilizing laser light illumination of a calibration pattern combined with acquisition of a reflected image by the second image sensor to enhance feature recognition accuracy of the calibration pattern, particularly under low-contrast or complex background conditions. The directional projection of laser light highlights edges and geometric features of the calibration pattern, while the high-resolution acquisition of the second image sensor further improves the signal-to-noise ratio and detail reconstruction capability of the image information, thereby enabling more precise detection of position deviations or printing defects of the nozzles. This active optical detection solution significantly improves the robustness and adaptability of the calibration system, particularly suitable for dynamic calibration requirements of high-precision industrial-grade printing equipment, effectively reducing ambient light interference while improving calibration efficiency.

In some embodiments, the control method further includes: determining printing information of the print head assembly based on the second image information, where the printing information includes at least one of a printing height, in the Z direction, of a target line in the second image information, or a printing length, in the X/Y direction, of the target line in the second image information; and adjusting the position of the print head assembly and a coordinate reference of the print head assembly based on a printing deviation corresponding to the printing information, where the printing deviation includes at least one of a deviation between the printing height in the Z direction and a theoretical height of the calibration pattern in the Z direction, or a deviation between the printing length in the X/Y direction and a theoretical length of the calibration pattern in the X/Y direction.

In these embodiments of the present application, the technical solution achieves closed-loop calibration of the printing system through high-precision visual measurement and intelligent compensation: by extracting the actual printed dimensions of the target line in the calibration pattern based on image analysis, the system automatically calculates the deviations from a theoretical model and generates three-dimensional compensation parameters through nonlinear mapping algorithms, dynamically adjusting the motion trajectories and extrusion amounts of the nozzles to improve dimensional accuracy of printed products while eliminating concentricity errors in multi-nozzle systems.

In some embodiments, the first acquisition device includes a second image sensor disposed on the print head assembly, and the control method further includes: in response to a third calibration instruction, controlling the print head assembly to move; when the print head assembly is in a state of motion, controlling the second image sensor to acquire a motion video of the print head assembly in the state of motion; and when a motion deviation determined based on the motion video exceeds a deviation range, adjusting a position of the print head assembly based on the motion video until the motion deviation falls within the deviation range.

In these embodiments of the present application, closed-loop control of dynamic motion accuracy is achieved through a nozzle-integrated vision system: during nozzle motion, the high-speed second image sensor captures motion trajectories in real-time, identifies dynamic deviations including vibration and offset through feature point tracking algorithms, and dynamically adjusts servo control parameters to reduce trajectory errors during high-speed nozzle motion while suppressing mechanical resonance, thereby improving boundary alignment accuracy in multi-material printing, with the entire calibration process being fully automated.

In some embodiments, the control method further includes: controlling the second image sensor to acquire target encoding information from a visual encoding plate below the print head assembly, and setting at least two frames of images containing the target encoding information as the motion video, where the visual encoding plate is detachably arranged on the printing platform of the printer and includes at least two pieces of encoding information; and the target encoding information is configured to calibrate a relative position between the print head assembly and the printing platform of the printer; and the adjusting the position of the print head assembly based on the motion video further includes: determining a motion trajectory of the print head assembly based on the target encoding information in the at least two frames of images in the motion video; determining a motion deviation of the print head assembly based on the motion trajectory and a standard trajectory corresponding to the third calibration instruction; and adjusting the position of the print head assembly and a coordinate reference of the print head assembly based on a motion compensation parameter corresponding to the motion deviation.

In these embodiments of the present application, the synergistic effect between the detachable visual encoding plate and high-speed image acquisition achieves sub-micron level dynamic calibration of nozzle motion trajectories: during nozzle motion, the integrated second image sensor continuously captures absolute position markers on the encoding plate, reconstructs the nozzle's six-degree-of-freedom motion trajectory in real-time by decoding target encoding information from at least two key frames of images, and performs spatiotemporal comparison with a theoretical path to automatically calculate motion deviations including positional offset and vibration amplitude parameters; the dynamically generated compensation parameters are injected into the motion system through a real-time control bus, reducing trajectory errors during high-speed motion while reducing positioning time during multi-nozzle switching, and supporting rapid recalibration for switching between different printing platforms (such as high-temperature heatbeds/flexible substrates).

A printer is provided according to an embodiment of the present application. The printer includes: a first acquisition device, a print head assembly, a processor, and a memory, where the print head assembly includes a first nozzle and a second nozzle; and the memory stores thereon a computer program executable on the processor, and the processor, when executing the computer program, controls the print head assembly to, in response to a control system of the printer, perform the following operations:

- controlling the first acquisition device to acquire first detection information of the print head assembly of the printer, where the first detection information is configured to determine at least one of a position of the first nozzle or a position of the second nozzle; performing at least one calibration on the print head assembly based on the first detection information, where the calibration includes: adjusting a position of the print head assembly based on a deviation of the print head assembly when the deviation exceeds a preset deviation range, where the deviation of the print head assembly is determined based on the at least one of a position of the first nozzle or a position of the second nozzle; controlling the first acquisition device to acquire second detection information of the print head assembly after the calibration; and switching the printer to a ready state or resuming a printing task, when the second detection information indicates that the deviation of the print head assembly falls within the preset deviation range.

In some embodiments, the printer is further configured to: in response to a first calibration instruction, control a distance sensor in the first acquisition device to acquire the first detection information of the print head assembly of the printer, where the first detection information includes at least one of a first distance in a Z direction between a target nozzle in the print head assembly and a printing platform of the printer, or a first distance in an X/Y direction between the first nozzle and the second nozzle in the print head assembly, where the target nozzle includes at least one of the first nozzle or the second nozzle; perform at least one calibration on the print head assembly based on the first detection information, including: when a deviation in the Z direction corresponding to the first distance in the Z direction exceeds a preset deviation range in the Z direction, adjusting a position of the print head assembly in the Z direction based on the deviation in the Z direction; and/or when a deviation in the X/Y direction corresponding to the first distance in the X/Y direction exceeds a preset deviation range in the X/Y direction, adjusting a position of the print head assembly in the X/Y direction based on the deviation in the X/Y direction; control the distance sensor in the first acquisition device to acquire second detection information of the print head assembly after the calibration, where the second detection information includes at least one of a second distance in the Z direction between the target nozzle in the print head assembly and the printing platform of the printer, or a second distance in the X/Y direction between the first nozzle and the second nozzle in the print head assembly; and switch the printer to the ready state or resume the printing task, when a deviation in the Z direction corresponding to the second distance in the Z direction falls within the preset deviation range in the Z direction, and a deviation in the X/Y direction corresponding to the second distance in the X/Y direction falls within the preset deviation range in the X/Y direction.

It should be understood that the above general description and the following detailed description are only exemplary and explanatory, and are not intended to limit the present application.

BRIEF DESCRIPTION OF THE DRAWINGS

The accompanying drawings herein are incorporated in the specification as a part thereof, showing embodiments that are implemented in accordance with the present application and used together with the specification to explain the technical solutions of the present application.

DETAILED DESCRIPTION

To make the objectives, technical solutions, and advantages of the present application clearer, the following further describes the present application in detail with reference to the accompanying drawings. The described embodiments should not be considered as limiting the present application, and all other embodiments obtained by those of ordinary skill in the art without making creative efforts shall fall within the protection scope of the present application.

In the following description, reference is made to "some embodiments", which describe a subset of all possible embodiments; however, it will be understood that "some embodiments" may be the same subset or different subsets of all possible embodiments and may be combined with each other without conflict.

In the following description, the terms "first\second\third" involved are merely used to distinguish similar objects and do not represent a specific ordering of the objects. It can be understood that "first\second\third" can be interchanged with a specific order or sequence where permitted, so that the embodiments of the present application described herein can be implemented in an order other than that illustrated or described herein.

Unless otherwise defined, all technical and scientific terms used herein have the same meaning as those commonly understood by those skilled in the art of the present application. The terms used herein are only for the purpose of describing the embodiments of the present application and are not intended to limit the present application.

The control method provided in the embodiments of the present application may be executed by electronic devices, which may include various types of terminals such as laptops, tablets, desktop computers, set-top boxes, mobile devices (e.g., mobile phones, portable music players, personal digital assistants, dedicated messaging devices, portable gaming devices, etc.), and printers, and may also be implemented as a server. The server may be an independent physical server, a server cluster or distributed system composed of a plurality of physical servers, or a cloud server providing fundamental cloud computing services including cloud services, cloud databases, cloud computing, cloud functions, cloud storage, network services, cloud communications, middleware services, domain name services, security services, content delivery networks (CDNs), as well as big data and artificial intelligence platforms.

The technical solutions in the embodiments of the present application will be clearly and completely described below with reference to the accompanying drawings in the embodiments of the present application.

Figure 1:
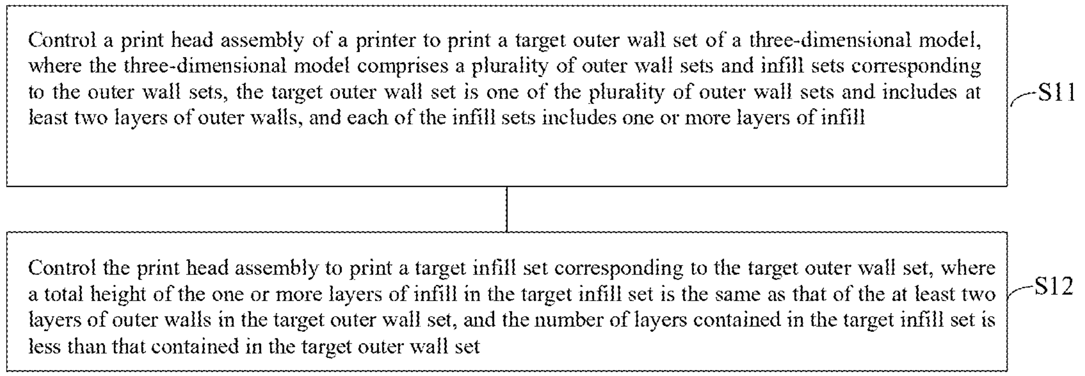
FIG. 1 is a schematic diagram of an implementation process of a printer control method provided in an embodiment of the present application.

FIG. 1 is a schematic diagram of an implementation process of a printer control method provided in an embodiment of the present application. As shown in FIG. 1, the control method includes the following steps S11 and S12.

In S11, a print head assembly of a printer is controlled to print a target outer wall set of a three-dimensional model, where the three-dimensional model includes a plurality of outer wall sets and infill sets corresponding to the outer wall sets, the target outer wall set is one of the plurality of outer wall sets and includes at least two layers of outer walls, and each of the infill sets includes one or more layers of infill.

In S12, the print head assembly is controlled to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set.

Herein, the printer at least includes the print head assembly, a driving device, and a working platform.

The print head assembly is connected to the driving device and is configured to generate a relative displacement with respect to the working platform under the drive of the driving device, so as to perform operations such as 3D printing, engraving, and cutting on the working platform. The print head assembly may be any suitable assembly capable of performing printing functions. The print head assembly includes at least one nozzle. For example, the print head assembly may include one nozzle. As another example, the print head assembly may include two nozzles. In some embodiments, the print head assembly may further include a heating assembly configured to heat a printing material to a molten state, where the nozzle is configured to extrude the molten material to perform model printing on the printing platform.

In some embodiments, the nozzle for printing the outer wall sets and the nozzle for printing the infill sets may be the same or different. For example, when the print head assembly includes one nozzle, both the outer wall sets and the infill sets may be printed through this nozzle. As another example, when the print head assembly includes a first nozzle and a second nozzle, the first nozzle may be configured to print the outer wall sets while the second nozzle may be configured to print the infill sets, or alternatively, both the outer wall sets and the infill sets may be printed through at least one of the first nozzle or the second nozzle.

In some embodiments, the print head assembly includes one nozzle; the step S11 includes the following step S111; and the step S12 includes the following step S121.

In S111, the nozzle is controlled to print the target outer wall set.

In S121, the nozzle is controlled to print the target infill set corresponding to the target outer wall set.

Herein, the nozzle is controlled to first print the outer wall sets and then, after completion of printing the outer wall sets, print the infill sets corresponding to the outer wall sets.

In these embodiments of the present application, the nozzle is controlled to first print the target outer wall set, and then the target infill set corresponding to the target outer wall set. In this way, by employing one nozzle to print both the outer wall sets and the infill sets: firstly, maintaining consistent material extrusion parameters (e.g., temperature and flow rate, etc.) reduces interlayer bonding issues caused by parameter variations, thereby enhancing the integrity between internal and external structures; secondly, compared to multi-nozzle operations, the use of one nozzle eliminates the mechanical complexity of multi-nozzle systems (e.g., calibration, synchronous control, etc.), reduces hardware failure rates and maintenance difficulty, and since no nozzle switching process is required, minimizes printing interruptions or material residue issues caused by switching, thereby improving equipment reliability and shortening the overall printing cycle; finally, continuous extrusion through one nozzle decreases the movement frequency of the print head assembly, reduces vibration errors caused by frequent starts and stops, and improves dimensional accuracy, consequently enhancing printing quality.

In some embodiments, the print head assembly includes a first nozzle and a second nozzle; the step S11 includes the following step S112; and the step S12 includes the following step S122.

In S112, a first target nozzle is controlled to print the target outer wall set, where the first target nozzle is selected from the first nozzle or the second nozzle.

In S122, a second target nozzle is controlled to print the target infill set corresponding to the target outer wall set, where the second target nozzle is selected from the first nozzle or the second nozzle.

Herein, characteristics of the first nozzle and characteristics of the second nozzle may be the same or different. The characteristics may include, but are not limited to, diameter, filament color, filament type, etc. The filament color may include, but is not limited to, any suitable color such as red, blue, and black. The filament may include, but is not limited to, ABS, PLA, etc. For example, the diameter of the first nozzle among the two nozzles may be 0.2 mm, while the diameter of the second nozzle may be 0.4 mm. In some embodiments, one of the first nozzle and the second nozzle may be fixed, while the other nozzle may be movable relative to the nozzle which is fixed in a target direction, which may refer to a direction perpendicular to a horizontal plane (e.g., the Z-axis direction in a three-dimensional coordinate system). The displacement in the target direction must remain within a movement range, which may be any suitable small range, such as 0-10 mm and 0-8 mm. During implementation, this movement range may be comprehensively determined based on factors such as the size of the print head assembly, the diameter of the nozzle, and the movement precision. In some embodiments, both the first nozzle and the second nozzle may be movable in the target direction.

In some embodiments, the diameter of the first nozzle may be smaller than that of the second nozzle.

In some embodiments, since the outer walls serve as critical components of the three-dimensional model's appearance, smoother surfaces and finer details may be achieved through high-precision nozzles or appropriate printing speeds, while the infill may employ lower-precision nozzles or faster printing speeds to focus on strength of the internal structures. During implementation, the precision of the first nozzle may be greater than that of the second nozzle, and/or control parameters of the first nozzle may differ from those of the second nozzle. The control parameters may include, but are not limited to, temperature, flow rate, etc.

In some embodiments, the first nozzle is controlled to first print the outer wall sets and then, after completion of printing the outer wall sets, print the infill sets corresponding to the outer wall sets.

In some embodiments, the second nozzle is controlled to first print the outer wall sets and then, after completion of printing the outer wall sets, print the infill sets corresponding to the outer wall sets.

In some embodiments, the first nozzle is controlled to first print the outer wall sets and then, after completion of printing the outer wall sets, the second nozzle is controlled to print the infill sets corresponding to the outer wall sets.

In some embodiments, the second nozzle is controlled to first print the outer wall sets and then, after completion of printing the outer wall sets, the first nozzle is controlled to print the infill sets corresponding to the outer wall sets.

In some embodiments, for printing the target outer wall set, the layers of outer walls therein may be sequentially printed according to their order; and for printing the target infill set, the layers of infill therein may be sequentially printed according to their order.

In these embodiments of the present application, the first target nozzle is controlled to print the target outer wall set, where the first target nozzle is selected from the first nozzle or the second nozzle; and the second target nozzle is controlled to print the target infill set corresponding to the target outer wall set, where the second target nozzle is selected from the first nozzle or the second nozzle. In this way, on one hand, when one nozzle is used to print both the outer wall sets and the infill sets, maintaining consistent material extrusion parameters reduces interlayer bonding issues caused by parameter variations, thereby enhancing the integrity between internal and external structures, and since no nozzle switching process is required, printing interruptions or material residue issues caused by switching are minimized, thereby improving equipment reliability and shortening the overall printing cycle; on the other hand, when two nozzles are used to separately print the outer wall sets and the infill sets, this configuration reduces the possibility of residual contamination during material switching in one nozzle, not only ensuring the purity of both outer walls and infill while reducing unnecessary material consumption, but also ensuring superior surface printing quality while reinforcing internal structural strength, thus optimizing printing quality and reducing costs; furthermore, by integrating two nozzles in the print head assembly, the dual-nozzle configuration can respectively handle model materials and soluble support materials (e.g., water-soluble or low-temperature hot-melt materials), enabling a smoother surface after support removal and reducing post-processing damage risks, while simultaneously supporting concurrent printing of two different materials (e.g., metal+ceramic or two polymers) to impart multi-zone functional characteristics to models (e.g., local conductivity, high-temperature resistance), thereby making it particularly suitable for applications requiring high complexity, functional diversity, or production efficiency.

In some embodiments, the step S112 includes the step S1121.

In S1121, for each of the at least two layers of outer wall in the target outer wall set, a height of the first target nozzle is adjusted to a height corresponding to the outer wall and controlling the first target nozzle to print the outer wall.

Herein, the height of the nozzle needs to be adjusted before printing to facilitate the printing operation. During implementation, if the first target nozzle is the first nozzle, the height of the first nozzle may be lowered and/or the height of the second nozzle may be raised to reduce interference from the second nozzle with the outer wall printed by the first nozzle, thereby improving the printing quality of the outer wall; if the first target nozzle is the second nozzle, the height of the second nozzle may be lowered and/or the height of the first nozzle may be raised to reduce interference from the first nozzle with the outer wall printed by the second nozzle, thereby improving the printing quality of the outer wall.

The height corresponding to the outer wall may include, but is not limited to, the height of the outer wall, a height greater than that of the outer wall, or a height less than that of the outer wall. In some embodiments, during printing of the outer wall, the height of the first target nozzle may be adjusted in real-time, in which case the height corresponding to the outer wall may be less than that of the outer wall. In some embodiments, the height of the first target nozzle may be adjusted to be greater than that of the outer wall, thereby not only reducing the number of height adjustments required for the first target nozzle but also decreasing the likelihood of contact between the first target nozzle and previously printed portions of the outer wall.

In these embodiments of the present application, on one hand, sequentially printing the layers of outer walls according to their order not only improves printing accuracy but also ensures printing quality while reducing printing time; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

In some embodiments, the step S122 includes the following step S1221.

In S1221, for each of the one or more layers of infill in the target infill set, a height of the second target nozzle is adjusted to a height corresponding to the infill and controlling the second target nozzle to print the infill.

Herein, the height of the nozzle needs to be adjusted before printing to facilitate the printing operation. During implementation, if the second target nozzle is the first nozzle, the height of the first nozzle may be lowered and/or the height of the second nozzle may be raised to reduce interference from the second nozzle with the infill printed by the first nozzle, thereby improving the printing quality of the infill; if the second target nozzle is the second nozzle, the height of the second nozzle may be lowered and/or the height of the first nozzle may be raised to reduce interference from the first nozzle with the infill printed by the second nozzle, thereby improving the printing quality of the infill.

The height corresponding to the infill may include, but is not limited to, the height of the infill, a height greater than that of the infill, or a height less than that of the infill. In some embodiments, during printing of the infill, the height of the second target nozzle may be adjusted in real-time, in which case the height corresponding to the infill may be less than that of the infill. In some embodiments, the height of the second target nozzle may be adjusted to be greater than that of the infill, thereby not only reducing the number of height adjustments required for the second target nozzle but also decreasing the likelihood of contact between the second target nozzle and previously printed portions of the infill.

In these embodiments of the present application, on one hand, sequentially printing the layers of infill according to their order improves printing accuracy; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

Figure 2:
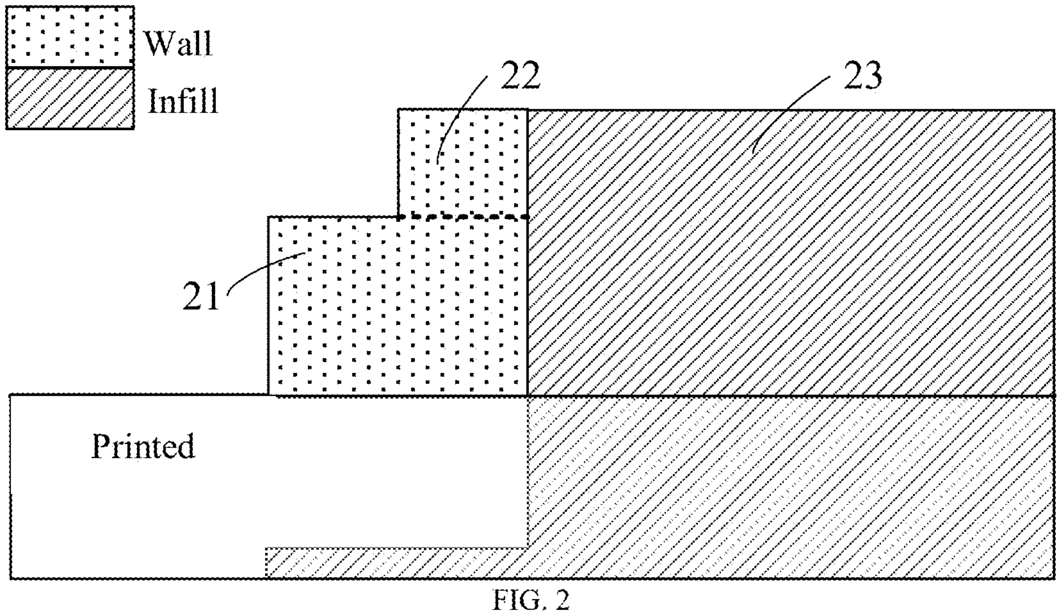
FIG. 2 is a schematic diagram of a print head assembly printing outer walls and infill provided in an embodiment of the present application.

FIG. 2 is a schematic diagram of a print head assembly printing outer walls and infill provided in an embodiment of the present application. As shown in FIG. 2, the print head assembly includes a first nozzle and a second nozzle, where the outer wall set includes a first outer wall 21 and a second outer wall 22, and the infill set includes a first infill 23. With the first outer wall 21 having a height of 0.18 mm, the second outer wall 22 having a height of 0.12 mm, and the first infill 23 having a height of 0.3 mm, the printing process of the print head assembly proceeds as follows.

First, the outer wall set is printed. The height of the first nozzle is lowered to print the first outer wall 21, and after completion of printing the first outer wall 21, the height of the first nozzle is raised to print the second outer wall 22.

After completion of printing the second outer wall 22, it is switched to the second nozzle.

Then the infill set is printed. The height of the second nozzle is lowered to print the first infill 23.

In this embodiment of the present application, sequentially printing the layers of outer walls according to their order followed by sequentially printing the layers of infill according to their order improves printing accuracy while ensuring printing quality and reducing printing time.

The three-dimensional model may be any suitable solid structure, for example, a sphere, a cube, etc. In some embodiments, prior to printing the three-dimensional model, printing data corresponding to the three-dimensional model may first be acquired, followed by sequential operations according to the printing data. The printing data may include, but is not limited to, a plurality of outer wall sets, infill sets corresponding to the outer wall sets, a printing sequence for the outer wall sets, and a printing sequence for the infill sets. In some embodiments, the print head assembly may be controlled to first print the outer wall sets and then print the corresponding infill sets.

In some embodiments, the three-dimensional model includes at least one section, and each of the at least one section is composed of a plurality of geometric shapes that may include, but are not limited to, triangles, rectangles, etc., where different sections may have the same or different dimensions. In some embodiments, each of the at least one section may correspond to a plurality of outer wall sets, where for the plurality of outer wall sets corresponding to the same section, two outer wall sets may contain the same number of layers, and heights of the layers of outer walls in the two outer wall sets may also be the same; while for the plurality of outer wall sets corresponding to two different sections, the number of layers contained in two outer wall sets, i.e., one outer wall set corresponding to one section and the other outer wall set corresponding to the other section, may be the same or different, and heights of the layers of outer walls in the two outer wall sets may be the same or different.

The outer wall set including the target outer wall set and other outer wall sets mentioned herein includes at least two layers of outer walls, where the heights of the at least two layers of outer walls may be the same or different. The outer surface (exterior wall) forms the outermost layer of the model, directly affecting both aesthetic quality and mechanical strength, and by printing a plurality of outer wall sets, the printing of the model's outer surface can be achieved.

The height of the outer wall or layer height may be any suitable height, for example, 0.06 mm, 0.1 mm, etc.

In some embodiments, the height of the outer wall may be determined based on at least one of the following: a diameter of the first nozzle, a section corresponding to the outer wall set, or a filament of the first nozzle, where the first nozzle is the nozzle for printing the outer wall.

In some embodiments, different filaments may correspond to the same or different layer heights of outer walls. During implementation, a correspondence relationship between each filament and a layer height of each outer wall may be pre-established, and according to the correspondence relationship, the layer height of the outer wall corresponding to the filament may be determined.

In some embodiments, the diameter of each nozzle corresponds to an appropriate printable layer height range. The fundamental principle of 3D printing involves melting and depositing a filament onto a plane through an extruder and heated nozzle, then stacking subsequent layers upon completion of the printing on a current plane. The vertical distance between the deposited filament and the plane constitutes the layer height. When the filament is melted and directly deposited on the plane, since the nozzle is typically circular, its cross-section is circular or approximately cylindrical. To ensure good interlayer bonding, the contact area between adjacent layers should be maximized, thus necessitating a restrained layer height. To increase the contact area between adjacent layers, the nozzle should be lowered in height, causing the extruded filament to deform under pressure into a quasi-rectangular shape with arc-shaped lateral edges. As the filament undergoes deformation, the extruder experiences corresponding reactive forces. That is to say, the extruder must apply pressure to the filament to enable proper deformation of the ultimately extruded filament between the nozzle and the printed layer. The pressure applied at the base is constrained by factors such as extruder capability and filament characteristics, having an upper limit of extrusion pressure. When the nozzle is positioned too low, insufficient pressure results in discontinuous extrusion, leading to poor model surface quality; meanwhile, the excessively low flow rate of the filament within the nozzle may cause additional issues. In such cases, a nozzle with a smaller diameter should be employed to facilitate easier extrusion of the base filament. Therefore, to ensure superior printing quality, a smaller diameter of the nozzle generally corresponds to a lower permissible layer height. Consequently, when ensuring both superior surface quality and structural strength of the model, a larger diameter of the nozzle generally accommodates a greater layer height, while conversely, a smaller diameter of the nozzle typically accommodates a reduced layer height. Excessively small or large layer heights compromise material flow characteristics and interlayer bonding strength, resulting in printing failures, diminished surface quality, reduced structural strength, etc. On that account, the diameter of each nozzle corresponds to an appropriate printable layer height range.

In some embodiments, different diameters of the nozzle correspond to different layer height ranges, from which the height of the outer wall may be determined. For example, when the diameter of the nozzle is 0.8 mm, the layer height range may be 0.24-0.56 mm; when the diameter of the nozzle is 0.4 mm, the layer height range may be 0.08-0.28 mm; and when the diameter of the nozzle is 0.2 mm, the layer height range may be 0.06-0.14 mm. The height of the outer wall may be determined from the layer height range through any suitable method. For example, the height of the outer wall may be determined from the layer height range according to user settings or default values. As another example, the value such as the mean, median, maximum, or minimum of the layer height range may be adopted as the layer height of the outer wall by default. Also for example, the height of the outer wall may be further determined from the layer height range according to factors such as the section corresponding to the outer wall set and the filament of the nozzle.

In some embodiments, the three-dimensional model includes at least one section, and for each of the plurality of outer wall sets, heights of the at least two layers of outer walls in the outer wall set are determined based on a section of the at least one section corresponding to the outer wall set.

Herein, the three-dimensional model includes a plurality of sections, each of which corresponds to a plurality of outer wall sets, and the printing of the section is completed by printing the plurality of outer wall sets.

The layer height of the outer wall may be determined through any suitable method.

For example, the layer height of the outer wall may be determined according to the area of the section, where different areas may correspond to different layer heights. In some embodiments, a correspondence relationship between each area and each layer height may be pre-established, and according to the correspondence relationship, the layer height adapted to the area may be obtained. In some embodiments, the layer height of the outer wall may be determined according to the area of the section through any suitable area-error-based adaptive slicing algorithm. In some embodiments, the layer height adapted to the area of the slice may be determined through any suitable neural network model capable of implementing the function of determining a layer height according to an area.

As another example, the layer height of the outer wall may be determined according to the slope of the section, where a steeper slope corresponds to a smaller layer height of the outer wall, while a gentler slope corresponds to a greater layer height of the outer wall. The slope of the section may be determined through any suitable method. In some embodiments, a correspondence relationship between each slope and each layer height may be pre-established, and according to the correspondence relationship, the layer height adapted to the slope may be obtained. In some embodiments, the layer height of the outer wall may be determined according to the slope of the section through any suitable slope-error-based adaptive slicing algorithm. In some embodiments, the layer height adapted to the slope of the slice may be determined through any suitable neural network model capable of implementing the function of determining a layer height according to a slope.

In some embodiments, the layer heights of respective outer walls within the outer wall set may be the same or different. Different outer wall sets corresponding to different sections may have varying layer heights of outer walls to achieve variable-diameter printing.

In these embodiments, the heights of layers of outer walls in the outer wall sets are dynamically determined according to the sections corresponding to the outer wall sets, which, compared with a uniform height of the layers of outer walls, not only improves the accuracy, flexibility and specificity of the heights of layers of outer walls, but also enhances the conformity between printed models and the three-dimensional model, thereby further improving surface smoothness and detail reproduction accuracy.

In some embodiments, the heights of the at least two layers of outer walls in the outer wall set are the same. By setting the same layer height for all outer walls in the outer wall set, it ensures printing quality while improving printing efficiency.

In some embodiments, the section corresponding to the outer wall set includes a plurality of triangles, and the heights of the at least two layers of outer walls in the outer wall set are determined based on a target angle between a normal vector of the target triangle in the section corresponding to the outer wall set and a target direction.

Herein, the target direction is perpendicular to the section corresponding to the outer wall set, e.g., the Z-axis direction in a three-dimensional coordinate system. The target triangle or triangular face refers to a triangle within the section. During implementation, the angle between the normal vector of the triangle and the target direction may first be determined, followed by comparing these angles to select a certain angle's corresponding triangle as the target triangle, with the angle serving as the target angle. This target angle may be the smallest or largest angle among all angles, or the angle closest to a preset angle. For example, the smallest angle may be selected as the target angle.

The layer height of the outer wall may be determined through any suitable method. In some embodiments, a correspondence relationship between each angle and each layer height may be pre-established, and according to the correspondence relationship, the layer height adapted to the target angle may be obtained. In some embodiments, the layer height of the outer wall may be determined according to the target angle through any suitable angle-error-based adaptive slicing algorithm. In some embodiments, the layer height adapted to the target angle may be determined through any suitable neural network model capable of implementing the function of determining a layer height according to an angle.

In these embodiments of the present application, by dynamically determining the heights of the at least two layers of outer walls based on the target angle between the normal vector of the target triangle in the section and the direction perpendicular to the section, precision requirements for different printing areas are more accurately identified: for triangular surfaces with larger slopes, smaller layer heights are employed to reduce errors, while for triangular surfaces with smaller slopes, larger layer heights are used to improve printing efficiency, ensuring that the printing results meet the precision requirements while optimizing printing efficiency, thereby achieving an optimal balance between quality and speed.

In some embodiments, the heights of the at least two layers of outer walls in the outer wall set are directly proportional to the target angle. That is to say, a larger target angle may correspond to a greater outer wall height, while a smaller target angle may correspond to a smaller outer wall height. In this way, by establishing a direct proportional relationship between the layer heights and the target angles, precision requirements for different printing areas are more accurately identified: for areas with smaller angles (i.e., steeper triangular face slopes), smaller layer heights are employed to reduce errors, while for areas with larger angles (i.e., gentler triangular face slopes), larger layer heights are used to improve printing efficiency, ensuring that the printing results meet the precision requirements while optimizing printing efficiency, thereby achieving an optimal balance between quality and speed.

In some embodiments, the heights of the at least two layers of outer walls in the outer wall set are determined based on the target angle and a maximum surface deviation.

Herein, the maximum surface deviation represents the maximum value of the surface deviation. The maximum surface deviation may be preset by slicing software or determined in real-time based on printing parameters. The printing parameters may include, but are not limited to, a layer height and a target ratio between a printing detail and a printing speed.

The layer height of the outer wall may be determined through any suitable method. In some embodiments, a correspondence relationship between each angle, the maximum surface deviation, and each layer height may be pre-established, and according to the correspondence relationship, the layer height adapted to the target angle and the maximum surface deviation may be obtained. In some embodiments, the layer height of the outer wall may be determined according to the target angle and the maximum surface deviation through any suitable area-error-based adaptive slicing algorithm. In some embodiments, the layer height adapted to the target angle and the maximum surface deviation may be determined through any suitable neural network model capable of implementing the function of determining a layer height according to an angle and a maximum surface deviation.

In these embodiments of the present application, the heights of the at least two layers of outer walls are dynamically adjusted based on the target angle corresponding to the section and the maximum surface deviation, where the adjustment of the heights of the at least two layers is constrained by the maximum surface deviation to select higher layer heights for reducing printing time while avoiding resource waste caused by excessively pursuing low layer heights, achieving an optimal balance between quality and efficiency, thereby making it particularly suitable for manufacturing complex models requiring simultaneous consideration of cost, speed, and precision.

In some embodiments, the maximum surface deviation is determined based on printing parameters of the printer, and the printing parameters include a layer height and a target ratio between a printing detail and a printing speed.

Herein, the layer height may be any suitable layer height, such as 0.2 mm. The layer height may be customized by a user through slicing software or may be a default value.

The target ratio may be any suitable ratio, for example, 0.5, 0.52, etc. The target ratio may also be customized by a user through slicing software or may be a default value.

The maximum surface deviation may be determined through any suitable method. In some embodiments, a correspondence relationship between each layer height, each target ratio, and each maximum surface deviation may be pre-established, and according to the correspondence relationship, the maximum surface deviation adapted to the layer height and the target ratio may be obtained. In some embodiments, the maximum surface deviation adapted to the layer height and the target ratio may be determined through any suitable neural network model capable of implementing the function of determining a maximum surface deviation according to layer height and a target ratio.

In these embodiments of the present application, the maximum surface deviation is dynamically determined based on printing parameters including a layer height and a target ratio, which, compared to a fixed maximum surface deviation, improves the accuracy, flexibility, and specificity of the maximum surface deviation, further enhancing the accuracy of layer height determination based on the maximum surface deviation, and ensuring printing precision while optimizing printing efficiency, thereby making it particularly suitable for processing models with complex geometric features (e.g., inclined surfaces, curved surfaces, etc.).

In some embodiments, the maximum surface deviation is determined by a target interpolation function, where parameters in the target interpolation function are determined based on the layer height and the target ratio.

Herein, the target interpolation function may be any suitable interpolation function, for example, linear interpolation functions such as lerp(•), or second-order polynomial interpolation functions, or third-order spline interpolation functions, where the function lerp(a, b, t) may be expressed as: $lerp(a, b, t)=a+(b-a)*t$, when $t=0$, the result equals a; when $t=1$, the result equals b; and when t takes an intermediate value between (0,1), the result varies linearly between a and b.

The maximum surface deviation may be either a first value of the target interpolation function determined according to a first parameter, or a second value of the target interpolation function determined according to a second parameter. During implementation, if the target ratio is less than a preset value, the first value serves as the maximum surface deviation; if the target ratio is not less than the preset value, the second value serves as the maximum surface deviation. The preset value may be any suitable value such as 0.5 or 0.6.

For example, if the target interpolation function is lerp(•), both the first parameter and the second parameter include a, b, t. During implementation, a may be taken as the minimum layer height $\varepsilon 1$, b as the target ratio, and t as the maximum layer height $\varepsilon 2$.

The minimum layer height $\varepsilon 1$ may be determined through any suitable method. In some embodiments, the minimum layer height $\varepsilon 1$ may be customized by a user through slicing software or may be a default value. In some embodiments, the minimum layer height $\varepsilon 1$ may be determined according to the diameter of the nozzle. Methods for determining the minimum layer height $\varepsilon 1$ may include, but are not limited to: the product between the diameter of the nozzle and a first weighting coefficient, or a weighted value of the product. The first weighting coefficient may be any suitable value such as 0.2, 0.15, or 0.3.

The maximum layer height $\varepsilon 2$ may be determined through any suitable method. In some embodiments, the maximum layer height $\varepsilon 2$ may be customized by a user through slicing software or may be a default value. In some embodiments, the maximum layer height $\varepsilon 2$ may be determined according to the diameter of the nozzle. Methods for determining the maximum layer height $\varepsilon 2$ may include, but are not limited to: the product between the diameter of the nozzle and a second weighting coefficient, or a weighted value of the product. The second weighting coefficient may be any suitable value such as 0.7, 0.75, or 0.8. During implementation, the second weighting coefficient is greater than the first weighting coefficient, where both the first and second weighting coefficients may be independently configured according to actual requirements, which is not limited in this embodiment of the present application.

In these embodiments of the present application, the maximum surface deviation is determined according to a target interpolation function, which not only improves the accuracy of the maximum surface deviation but also ensures that the maximum surface deviation is always maintained within an allowable range, avoiding local overload or under-compensation, thereby making it particularly suitable for 3D printing applications requiring simultaneous consideration of precision, efficiency, and complex surface treatment.

In some embodiments, for 3D models with complex geometric features, an appropriate adaptive slicing algorithm may be employed to determine the layer height of the outer wall. For example, the adaptive slicing algorithm may be an area-error-based Vojtech algorithm, whose core concept involves dynamically adjusting the layer height according to the triangular face slope while controlling the area error through the maximum surface deviation: a steeper triangular slope utilizes a smaller layer height to reduce the error, while a gentler triangular slope employs a larger layer height to improve printing efficiency, thereby ensuring printed results meet precision requirements while simultaneously optimizing printing efficiency.

The first layer height $l\_h1$ corresponding to the triangular face calculated by the Vojtech algorithm may be expressed by the following formula (1-1), namely:

$$1\_h1 = \alpha \cdot \sqrt{\frac{max\_s\_d * n\_sin\,\theta}{n\_cos\theta}}; \tag{1-1}$$

where max_s_d represents the maximum surface deviation, which controls printing precision; n_sin θ represents a vertical component of a normal vector $\vec{n}$ in the Z-direction (i.e., the slope of the triangular face); n_cos θ represents a horizontal component of the normal vector $\vec{n}$ in the Z-direction (i.e., the flatness of the triangular face); and α represents a weighting coefficient, and a may be any suitable value such as 1.44.

In some embodiments, when the normal vector of the triangular face approaches vertical (n_cos θ→0), the first layer height l_h1 in Formula (1-1) tends toward infinity, causing a failure in calculation of the first layer height corresponding to the triangular face. Therefore, constraints need to be added in practice. For example, setting a minimum threshold for n_cos θ: when n_cos θ is less than the minimum threshold, the target layer height corresponding to the triangular face may be a maximum layer height FLT_MAX (indicating incalculable); when n_cos θ is not less than the minimum threshold, the target layer height corresponding to the triangular face may be l_h1 in Formula (1-1). Consequently, the target layer height face_l__h corresponding to the triangular face may be expressed by the following formula (1-2), namely:

$$face\_1\_h = \min\left(\frac{max\_s\_d}{\gamma 1},\ ((n\_cos0 > \gamma 2)?1\_h1 : FLT\_MAX)\right)\Bigg); \tag{1-2}$$

where max_s_d represents the maximum surface deviation; γ1 represents a deviation weighting coefficient, and γ1 may be any suitable value such as 0.184 or 0.2; n_cos θ represents the horizontal component of the triangular face's normal vector $\vec{n}$ in the Z-direction; γ2 represents the minimum threshold, and γ2 may be any suitable value such as 1e-5; and FLT_MAX represents the maximum layer height.

In some embodiments, the maximum surface deviation max_s_d may be determined according to the following formula (1-3), namely:

$$max\_s\_d=(c<0.5)?X1:X2 \tag{1-3};$$

where X1=lerp(ε1, delta_mid, μ*c); X2=lerp(ε2, delta_mid, μ*(1.0–c)); c represents a target ratio between a printing detail and a printing speed; delta_mid represents a configured layer height; ε1 represents a minimum layer height; ε2 represents a maximum layer height; μ represents a ratio weighting coefficient that may be any suitable value such as 2, 2.5, or 3; and the function lerp(•) is a linear interpolation function.

Thus, the height of the outer wall may be determined according to all target layer heights corresponding to the triangular faces in the section. For example, the minimum target layer height among all target layer heights corresponding to the triangular faces may be taken as the height of the outer wall. As another example, the mean of the target layer heights corresponding to all triangular faces may be taken as the height of the outer wall. Furthermore, the median of the target layer heights corresponding to all triangular faces may be taken as the height of the outer wall.

In some embodiments, the height height_t of the outer wall may be determined according to the following formula (1-4), namely:

$$height\_t=\min(height_c,face_{l_{h[i]}}) \tag{1-4};$$

where face_l_h[i] represents a target layer height corresponding to an ith triangular face, which may be determined by the aforementioned formula (1-2); i does not exceed the total number of triangular faces in the section; height_c represents a current height of the outer wall. During implementation, the height height_t of the outer wall is determined through multiple iterations to take the minimum target layer height among all target layer heights corresponding to the triangular faces as the height of the outer wall.

In some embodiments, for each of the plurality of outer wall sets, the number of layers contained in the outer wall set is determined based on a diameter of the print head assembly and heights of the at least two layers of outer walls in the outer wall set.

Herein, the diameter of the print head assembly refers to the diameter of the nozzle. During implementation, when the print head assembly includes a single nozzle, the diameter of the print head assembly equals the diameter of the single nozzle; when the print head assembly includes a plurality of nozzles, the diameter of the print head assembly corresponds to the diameter of the nozzle for printing the infill.

The number of layers contained in the outer wall set falls within a layer count range, where the minimum value of the layer count range is 2 and the maximum value is the floor value of $$\frac{d1}{height\_t},$$

with d1 being the diameter of the print head assembly and height_t being the height of the outer wall. In some embodiments, the number of layers contained in the outer wall set may be the floor value of $$\frac{d1}{height\_t}.$$

In some embodiments, the number of layers may be selected based on factors such as a printing precision and a printing speed. During implementation, the product of the number of layers contained in the outer wall set and the height of the outer wall shall not exceed the diameter of the nozzle for printing the infill.

In these embodiments of the present application, the number of layers of outer walls is dynamically determined according to the diameter of the print head assembly and the heights of layers of outer walls, achieving constraint of the number of layers of outer walls through the diameter of the print head assembly and the heights of layers of outer walls, which improves the accuracy and reasonableness of the number of layers and achieves an optimal balance between quality and efficiency.

The infill set including the target infill set and other infill sets mentioned herein includes one or more layers of infill, where the heights of the one or more layers of infill may be the same or different. The three-dimensional model includes infill, which determines the internal support structure and influences weight, material consumption, and mechanical properties. During the printing process, patterns such as grids/honeycombs or lines/crosses may be employed for infill. The grid/honeycomb pattern provides optimal strength at high densities and is suitable for load-bearing components. The line/cross pattern is applicable for conventional printing to balance efficiency and strength. Infill materials may include, but are not limited to, sound/heat insulation materials or grouting materials.

The height of the infill or layer height may be any suitable height, for example, 0.3 mm, 0.6 mm, etc.

In some embodiments, the height of the infill may be determined based on at least one of the following: a diameter of the second nozzle, a filament of the second nozzle, or an outer wall set corresponding to the infill set, where the second nozzle is the nozzle for printing the infill.

In some embodiments, different filaments may correspond to the same or different layer heights of infill. During implementation, a correspondence relationship between each filament and a layer height of each infill may be pre-established, and according to the correspondence relationship, the layer height of the infill corresponding to the filament may be determined.

In some embodiments, different diameters of the second nozzle may correspond to the same or different layer heights of infill. During implementation, a correspondence relationship between each diameter and a layer height of each infill may be pre-established, and according to the correspondence relationship, the layer height of the infill corresponding to the diameter of the second nozzle may be determined.

In some embodiments, for each of the infill sets, the number of layers contained in the infill set and heights of the one or more layers of infill in the infill set are determined based on an outer wall set of the plurality of outer wall sets corresponding to the infill set.

Herein, the number of layers contained in the infill set may be determined according to the height of each layer of infill in the infill set and the outer wall set corresponding to the infill set. For example, when the height of the infill is determined, the number of layers contained in the infill set is determined based on a ratio between the total height of the at least two layers of outer walls in the outer wall set and the height of the infill. For example, when the height of the infill is 0.3 mm, if the total height of the at least two layers of outer walls in the outer wall set is 0.3 mm, then the infill set contains 1 layer.

The height of each layer of infill contained in the infill set may be determined according to the number of layers contained in the infill set and the outer wall set corresponding to the infill set. For example, when the number of layers contained in the infill set is determined, the height of the infill is determined based on a ratio between the total height of the at least two layers of outer walls in the outer wall set and the number of layers contained in the infill set. For example, when the number of layers contained in the infill set is 2, if the total height of the at least two layers of outer walls in the outer wall set is 0.3 mm, then the height of the infill may be 0.15 mm.

In these embodiments of the present application, the number of layers contained in the infill set and heights of layers of infill in the infill set are determined based on the outer wall set corresponding to the infill set. In this way, the corresponding number and heights of layers of infill are dynamically determined according to the number and heights of layers of outer walls, and by matching the infill height with the outer wall height: on one hand, the mechanical properties of internal support structures can be optimized to enable the three-dimensional model to achieve uniform compressive and tensile strength in both the XY plane and the Z-axis direction, thereby avoiding deformation, collapse, or local weakness of outer walls caused by stress concentration or directional differences; on the other hand, the load requirements for the model can be precisely matched to reduce material waste, while simultaneously realizing flexible configuration of both the number of layers of infill and the infill heights, ultimately achieving an optimal balance among strength, efficiency, cost, and environmental sustainability for printed models.

In some embodiments, the three-dimensional model may further include one or more layers of inner walls located on an inner side of the outer surface for connecting infill structures and balancing internal support with external strength. Each inner wall may correspond to a plurality of inner wall sets, and by printing the plurality of inner wall sets, the printing of the at least one inner wall of the model is achieved. The printing of the inner wall may employ either variable-diameter or fixed-diameter printing. During implementation, if the variable-diameter printing is employed for the inner wall, the plurality of inner wall sets corresponding to the inner wall may be determined with reference to the aforementioned determination process for the outer wall sets.

In some embodiments, in a case that the three-dimensional model includes one or more layers of inner wall, the inner wall may be printed first, followed by the printing of the outer surface and the infill in sequence.

In this embodiment of the present application, a print head assembly of the printer is controlled to print a target outer wall set of a three-dimensional model, where the three-dimensional model includes a plurality of outer wall sets and infill sets corresponding to the outer wall sets, the target outer wall set is one of the plurality of outer wall sets and includes at least two layers of outer walls, and each of the infill sets includes one or more layers of infill; and the print head assembly is controlled to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set. In this way, by first printing an outer wall set including at least two layers of outer walls and then printing an infill set including one or more layers of infill: on one hand, compared with conventional technologies in the related art where the layer height of outer walls is equal to that of infill, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

Figure 3:
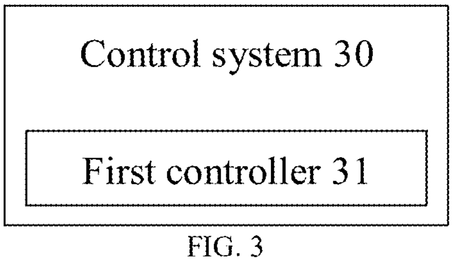
FIG. 3 is a schematic diagram of a structure of a printer control system provided in an embodiment of the present application.

Based on the foregoing embodiments, a printer control system is further provided according to an embodiment of the present application. FIG. 3 is a schematic diagram of a structure of a printer control system provided in this embodiment of the present application. As shown in FIG. 3, the control system 30 includes a first controller 31, where the first controller is configured to: control a print head assembly of a printer to print a target outer wall set of a three-dimensional model; and control the print head assembly to print a target infill set corresponding to the target outer wall set, where the three-dimensional model includes a plurality of outer wall sets and infill sets corresponding to the outer wall sets, the target outer wall set is one of the plurality of outer wall sets and includes at least two layers of outer walls, each of the infill sets includes one or more layers of infill, and a total height of the one or more layers of infill in the target infill set is the same as that of the at least two layers of outer walls in the target outer wall set, and the number of layers contained in the target infill set is less than that contained in the target outer wall set.

Herein, the controller including the first controller and other controllers mentioned herein may be any suitable component capable of implementing the control function, for example, a microcontroller unit (MCU), a central processing unit (CPU), a digital signal processor (DSP), a field programmable gate array (FPGA), a single-chip microcomputer, etc.

The print head assembly may be any suitable assembly capable of performing printing functions. The print head assembly includes at least one nozzle. In some embodiments, the nozzle for printing the outer wall sets and the nozzle for printing the infill sets may be the same or different.

The outer wall set includes at least two layers of outer walls, where the height of each layer of outer wall may be the same or different. For the process of the first controller controlling the print head assembly to print the outer wall sets, reference may be made to the embodiments of the aforementioned step S11.

The infill set includes one or more layers of infill, where the height of each layer of infill may be either the same or different. For the process of the first controller controlling the print head assembly to print the infill sets, reference may be made to the embodiments of the aforementioned step S12.

In this embodiment of the present application, the first controller first prints an outer wall set including at least two layers of outer walls and then prints an infill set including one or more layers of infill so that: on one hand, compared with conventional technologies in the related art where the layer height of outer walls is equal to that of infill, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

The above controller embodiment is similar to the above method embodiments in description and has similar beneficial effects as the method embodiments. For the technical details undisclosed in the controller embodiment of the present application, reference may be made to the description of the method embodiment of the present application.

In the related art, since minimal mechanical errors may exist during the installation of a print head assembly, periodic or real-time calibration of the print head assembly is required.

For a print head assembly with a plurality of nozzles, precise alignment of the plurality of nozzles in the X, Y, and Z directions must be ensured, as even minor deviations on the order of a few tenths of a millimeter may cause layer misalignment during printing, resulting in issues such as seams, overlaps, or gaps. Currently, it typically requires setting a relative offset between the plurality of nozzles in the printing software, which necessitates both accurate physical measurement of the nozzles' actual positions and precise setting of these measurements in the printing software. If the offset is incorrectly set, layer alignment cannot be maintained during nozzle switching, resulting in visible seam marks on printed objects. During actual printing operations, the requirements for calibration and alignment precision become more stringent when the nozzles operate under high-speed movement and frequent switching conditions. Any dynamic deviations may accumulate during prolonged printing processes, leading to progressive degradation of overall printing quality, thereby making maintenance and real-time adjustments non-negligible challenges.

The printer control method provided in this embodiment of the present application has the following advantages: first, it automatically detects and calibrates relative offsets and angular errors of a print head assembly along X, Y, and Z axes to prevent offset accumulation caused by mechanical installation errors, thermal expansion/contraction, and long-term use; second, it reduces operational difficulty and time costs associated with manual calibration while improving printing accuracy and printer stability; and finally, it ensures nozzle alignment consistently meets high-precision printing requirements through implementation of real-time or periodic calibration during the printing process.

Figure 4:
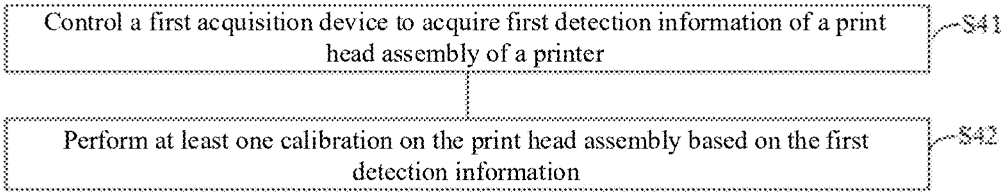
FIG. 4 is a schematic diagram of an implementation process of another printer control method provided in an embodiment of the present application.

FIG. 4 is a schematic diagram of an implementation process of another printer control method provided in an embodiment of the present application. As shown in FIG. 4, the control method includes the following steps S41 and S42.

In S41, a first acquisition device is controlled to acquire first detection information of a print head assembly of a printer.

In S42, at least one calibration is performed on the print head assembly based on the first detection information.

Herein, the first acquisition device may be any suitable device capable of acquiring information from the print head assembly. For example, the first acquisition device may be a high-resolution LiDAR camera, a binocular camera, a laser sensor, an infrared sensor, an image capture card, etc. In some embodiments, the first acquisition device may include multiple types of sensors to obtain the print head assembly's position from multiple angles, thereby improving positional detection accuracy and achieving more stable calibration.

The detection information including the first detection information and other detection information mentioned herein may include, but is not limited to, infrared information, laser information, image information, etc. During implementation, the first acquisition device may acquire the detection information periodically, in real-time, or upon receiving an acquisition instruction.

The calibration process may include, but is not limited to, preprocessing, feature extraction, and deviation compensation. Herein, preprocessing refers to performing grayscale conversion and noise reduction on the first detection information; feature extraction refers to extracting a three-dimensional position and calibration point information of a nozzle using algorithms such as template matching, edge detection, or deep learning; and deviation compensation refers to automatically adjusting a coordinate reference or correcting a printing path based on a compensation parameter, which is determined according to a deviation of the print head assembly. The deviation of the print head assembly may include, but is not limited to, a positional deviation or an angular deviation. For example, the calibration process may include feature extraction+deviation compensation. As another example, the calibration process may include preprocessing+feature extraction+deviation compensation.

In some embodiments, after completing a calibration of the print head assembly, a post-compensation validation may be performed on the calibrated print head assembly. The post-compensation validation refers to validating the print head assembly following deviation compensation to determine whether the deviation of the print head assembly falls within a preset deviation range. If the deviation of the print head assembly falls within the preset deviation range, the printer may be switched to a ready state for printing operations; and if the deviation of the print head assembly exceeds the preset deviation range, recalibration is required until the deviation of the print head assembly falls within the preset deviation range before switching the printer to the ready state. The preset deviation range may be any suitable range and, during implementation, may be configured according to factors such as the printer's printing precision, the first acquisition device's sensitivity, and the first acquisition device's accuracy, which is not limited in this embodiment of the present application.

In some embodiments, calibration of the print head assembly may be performed either prior to printing or during nozzle switching within the print head assembly.

In some embodiments, an adjustable fine-tuning mechanism may be further incorporated at the print head assembly's installation position for automatic calibration of the print head assembly, where the fine-tuning mechanism achieves preliminary alignment through physical adjustment before subsequent software calibration via the steps S41 and S42 to enhance precision.

In some embodiments, a dimensional deviation of an initial print sample may be analyzed to automatically correct a printing path based on the deviation, thereby indirectly correcting nozzle alignment issues.

In this embodiment of the present application, the first acquisition device is controlled to acquire the first detection information of the print head assembly of the printer; and at least one calibration is performed on the print head assembly based on the first detection information. In this way, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving print quality while guaranteeing that printing results meet high-precision requirements; finally, the first acquisition device can be integrated into existing FDM printers, demonstrating good compatibility and upgradability.

In some embodiments, the step S42 includes the following steps S421 to S423.

In S421, one calibration is performed on the print head assembly based on the first detection information.

In S422, the first acquisition device is controlled to acquire second detection information of the print head assembly.

In S423, the printer is switched to a ready state in a case that the second detection information indicates that the deviation of the print head assembly falls within the preset deviation range.

Herein, one calibration may include, but is not limited to, preprocessing, feature extraction, and deviation compensation. During implementation, the first detection information may first undergo preprocessing to obtain target first detection information; then, algorithms such as template matching, edge detection, or deep learning may be applied to extract a three-dimensional position and calibration point information of a nozzle from the target first detection information; subsequently, deviation information of the nozzle may be calculated based on the three-dimensional position and the calibration point information; finally, a compensation parameter may be computed according to the nozzle's deviation information, followed by automatically adjusting a coordinate reference or correcting a printing path based on the compensation parameter.

The second detection information may include, but is not limited to, infrared information, laser information, image information, etc. During implementation, after performing one calibration on the print head assembly, the first acquisition device may be controlled to further acquire second detection information of the print head assembly, so as to perform post-compensation validation of the print head assembly based on the second detection information. During implementation, if the deviation of the print head assembly exceeds the preset deviation range, recalibration is required until the deviation of the print head assembly falls within the preset deviation range; if the deviation of the print head assembly falls within the preset deviation range, the printer is switched to a ready state.

For example, take a print head assembly including a first nozzle and a second nozzle as an example to illustrate the whole calibration process.

(1) A printer is switched to the first nozzle and a zeroing operation is performed on the mechanical coordinates X, Y, and Z of the printer, where a LiDAR camera (corresponding to the aforementioned first acquisition device) acquires first detection information of the first nozzle (including three-dimensional images and laser data); then, switching the printer to the second nozzle, where the LiDAR camera acquires first detection information of the second nozzle (including three-dimensional images and laser data).

(2) Preprocessing such as grayscale conversion and noise filtering is performed on the first detection information of the first nozzle and on the first detection information of the second nozzle.

(3) Algorithms including template matching, edge detection, and deep learning are applied to perform feature extraction on preprocessed first detection information of the first nozzle to obtain a three-dimensional position of the first nozzle and calibration point information of the first nozzle, and feature extraction is performed on preprocessed first detection information of the second nozzle to obtain a three-dimensional position of the second nozzle and calibration point information of the second nozzle.

(4) A deviation of a true center of the first nozzle in the first detection information of the first nozzle is determined according to the three-dimensional position of the first nozzle and the calibration point information of the first nozzle, and a deviation of a true center of the second nozzle in the first detection information of the second nozzle is determined according to the three-dimensional position of the second nozzle and the calibration point information of the second nozzle;

(5) A compensation parameter for the first nozzle is determined according to the deviation of the true center of the first nozzle, and a compensation parameter for the second nozzle is determined according to the deviation of the true center of the second nozzle; a coordinate reference of a motion control system of the printer is automatically adjusted or a printing path is directly corrected according to the compensation parameters for both the first nozzle and the second nozzle, thereby ensuring that materials extruded by both the first nozzle and the second nozzle are accurately superimposed in physical position during printing; and when it is subsequently switched to the second nozzle, an offset of the global mechanical coordinates X, Y, and Z is set to be the deviation of the true center of the second nozzle minus the deviation of the true center of the first nozzle.

(6) After adjustment, the LiDAR camera is reactivated to acquire second detection information of the first nozzle and second detection information of the second nozzle, so as to verify calibration effectiveness based on the second detection information of the first nozzle and the second detection information of the second nozzle until the deviation of the first nozzle and the deviation of the second nozzle are controlled within the preset deviation range, whereupon a printing task is resumed.

In these embodiments of the present application, one calibration is performed on the print head assembly based on the first detection information; the first acquisition device is controlled to further acquire second detection information of the print head assembly; and in a case that the second detection information indicates that the deviation of the print head assembly falls within the preset deviation range, the printer is switched to a ready state. In this way, post-calibration deviation validation is performed on the calibrated print head assembly to ensure actual calibration effectiveness, which not only reduces the likelihood of error re-accumulation due to prolonged use or environmental changes, but also establishes closed-loop management by integrating calibration with validation, simultaneously guaranteeing immediate printing quality correction while maintaining equipment performance stability, ultimately achieving comprehensive optimization of efficiency, cost, and compliance.

In some embodiments, in a case that the second detection information indicates that the deviation of the print head assembly exceeds the preset deviation range, the control method further includes the following steps S424 and S425.

In S424, the first acquisition device is controlled to acquire next first detection information of the print head assembly.

In S425, at least one calibration is performed on the print head assembly based on the next first detection information.

Herein, the next first detection information refers to the first detection information acquired in a next acquisition, where an acquisition method of the next first detection information may be the same as or different from that of the first detection information. For example, when the first acquisition device includes one camera, both the first detection information and the next first detection information may be acquired through the camera. As another example, when the first acquisition device includes two cameras, the first detection information may be acquired through one camera while the next first detection information may be acquired through the other camera.

Since the deviation of the print head assembly exceeds the preset deviation range, recalibration of the print head assembly is required, and reference may be made to the embodiments of the aforementioned step S42 for the process of performing the recalibration on the print head assembly based on the next first detection information.

In these embodiments of the present application, when deviation validation fails, the print head assembly undergoes recalibration, which may further eliminate residual minor errors (e.g., nozzle misalignment or extrusion volume deviations) that may persist after the previous calibration. In this way, it not only prevents stair-stepping artifacts or dimensional inaccuracies caused by inconsistent layer thickness, but also maintains surface flatness and interlayer bonding strength, thereby ensuring both printing output precision and equipment operation reliability.

In some embodiments, the print head assembly further includes a first nozzle and a second nozzle, and the control method further includes the following steps S431 to S434.

In S431, in response to detecting a nozzle switching instruction, the first acquisition device is controlled to acquire third detection information of an active nozzle, where the active nozzle is selected from the first nozzle or the second nozzle.

In S432, another nozzle of the first nozzle or the second nozzle is switched to the active nozzle.

In S433, the first acquisition device is controlled to acquire fourth detection information of the active nozzle.

In S434, at least one calibration is performed on the active nozzle based on the third detection information and the fourth detection information.

Herein, the nozzle switching instruction may be any suitable instruction capable of implementing nozzle switching. A generation method of the nozzle switching instruction may be any suitable method, for example, an automatically generated nozzle switching instruction during printing, or a user-set nozzle switching instruction.

The third detection information and the fourth detection information may include, but are not limited to, infrared information, laser information, image information, etc.

During implementation, when a current active nozzle is the first nozzle: if a next active nozzle remains the first nozzle, nozzle switching is unnecessary, and validation may or may not be performed on the first nozzle; if the next active nozzle is the second nozzle, then after switching from the first nozzle to the second nozzle, validation must be performed on the second nozzle. Similarly, when a current active nozzle is the second nozzle: if a next active nozzle remains the second nozzle, nozzle switching is unnecessary, and validation may or may not be performed on the second nozzle; if the next active nozzle is the first nozzle, then after switching from the second nozzle to the first nozzle, validation must be performed on the first nozzle.

When switching nozzles in the print head assembly, calibration of the switched-to nozzle is required to enhance precision of subsequent operations. The calibration process may include, but is not limited to, preprocessing, feature extraction, and deviation compensation.

During implementation, an initial calibration of the active nozzle may first be performed based on the third detection information and the fourth detection information with reference to the embodiments of the aforementioned step S42. After completing the initial calibration, post-compensation validation of the active nozzle's calibration is conducted to ensure a deviation of the active nozzle falls within a deviation range of the active nozzle. If the deviation of the active nozzle falls within the deviation range, the printer may be switched to a ready state for printing operations; and if the deviation of the active nozzle exceeds the deviation range, recalibration is required until the deviation of the active nozzle falls within the deviation range before switching the printer to the ready state. The deviation ranges of different active nozzles may be the same or different.

In these embodiments of the present application, in response to detecting a nozzle switching instruction, the first acquisition device is controlled to acquire third detection information of an active nozzle, where the active nozzle includes either the first nozzle or the second nozzle; another nozzle is switched to the active nozzle; the first acquisition device is controlled to acquire fourth detection information of the active nozzle; and at least one calibration is performed on the active nozzle based on both the third detection information and the fourth detection information. In this way, when switching nozzles, by dynamically monitoring and calibrating the active nozzle, mechanical deviations caused by temperature changes or prolonged use can be overcome, which not only improves printing stability and reliability, but also enhances equipment durability.

In some embodiments, the step S434 includes the following steps S4341 to S4343.

In S4341, one calibration is performed on the active nozzle based on the third detection information and the fourth detection information.

In S4342, the first acquisition device is controlled to acquire next fourth detection information of the active nozzle.

In S4343, the printer is switched to a ready state in a case that the next fourth detection information indicates that the deviation of the active nozzle falls within the preset deviation range.

Herein, one calibration may include, but is not limited to, preprocessing, feature extraction, and deviation compensation. For the process of calibrating the active nozzle, reference may be made to the embodiments of the aforementioned step S42.

The next fourth detection information refers to the fourth detection information acquired in a next acquisition, where an acquisition method of the next fourth detection information may be the same as or different from that of the fourth detection information. For example, when the first acquisition device includes one camera, both the fourth detection information and the next fourth detection information may be acquired through the camera. As another example, when the first acquisition device includes two cameras, the fourth detection information may be acquired through one camera while the next fourth detection information may be acquired through the other camera.

During implementation, if the deviation of the active nozzle exceeds the deviation range, recalibration is required until the deviation of the active nozzle falls within the deviation range; if the deviation of the active nozzle falls within the deviation range, the printer is switched to a ready state.

In these embodiments of the present application, post-calibration deviation validation is performed on the calibrated active nozzle to ensure actual calibration effectiveness, which not only reduces the likelihood of error re-accumulation due to prolonged use or environmental changes, but also establishes closed-loop management by integrating calibration with validation, simultaneously guaranteeing immediate printing quality correction while maintaining equipment performance stability, ultimately achieving comprehensive optimization of efficiency, cost, and compliance.

In some embodiments, when the next fourth detection information indicates that the deviation of the active nozzle exceeds the deviation range, the control method further includes the following step S4344.

In S4344, at least one calibration is performed on the active nozzle based on both the third detection information and the next fourth detection information.

Herein, since the deviation of the active nozzle exceeds the deviation range of the active nozzle, recalibration of the active nozzle is required. For the process of performing the recalibration on the active nozzle based on the next fourth detection information and the third detection information, reference may be made to the embodiments of the aforementioned step S4341.

In these embodiments of the present application, when deviation validation fails, the active nozzle undergoes recalibration, which may further eliminate residual minor errors (e.g., nozzle misalignment or extrusion volume deviations) that may persist after the previous calibration. In this way, it not only prevents stair-stepping artifacts or dimensional inaccuracies caused by inconsistent layer thickness, but also maintains surface flatness and interlayer bonding strength, thereby ensuring both printing output precision and equipment operation reliability.

Figure 5:
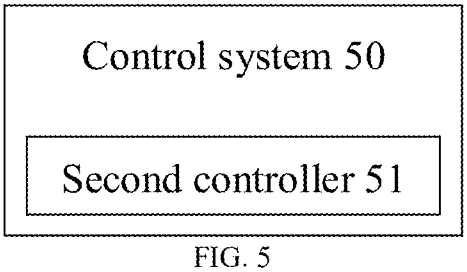
FIG. 5 is a schematic diagram of a structure of another printer control system provided in an embodiment of the present application.

Based on the foregoing embodiments, a printer control system is further provided according to an embodiment of the present application. FIG. 5 is a schematic diagram of a structure of another printer control system provided in this embodiment of the present application. As shown in FIG. 5, the control system 50 includes a second controller 51, where the second controller is configured to: control a first acquisition device to acquire first detection information of a print head assembly of a printer; and perform at least one calibration on the print head assembly based on the first detection information.

Herein, the second controller may be any suitable component capable of implementing the control function, for example, an MCU, a CPU, a DSP, an FPGA, a single-chip microcomputer, etc. During implementation, the second controller and the first controller may be the same or different.

The first acquisition device may be any suitable device capable of acquiring information from the print head assembly. For example, the first acquisition device may be a high-resolution LiDAR camera, a binocular camera, a laser sensor, an infrared sensor, an image capture card, etc.

The first detection information may include, but is not limited to, infrared information, laser information, image information, etc. During implementation, for the process of the second controller controlling the first acquisition device to acquire the first detection information, reference may be made to the embodiments of the aforementioned step S41.

The calibration process may include, but is not limited to, preprocessing, feature extraction, and deviation compensation. During implementation, for the process of the second controller controlling the calibration of the print head assembly, reference may be made to the embodiments of the aforementioned step S42.

In some embodiments, after completing one calibration of the print head assembly, the second controller may further control a post-compensation validation of the calibrated print head assembly.

Figure 6:
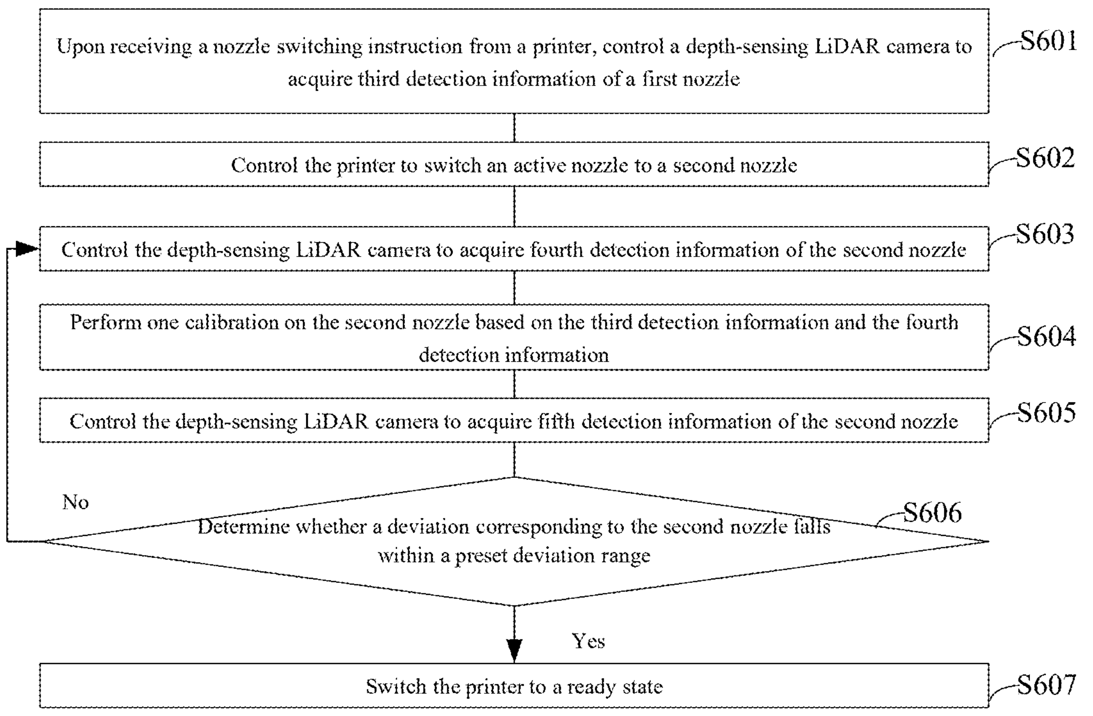
FIG. 6 is a schematic diagram of an implementation process of yet another printer control method provided in an embodiment of the present application.

FIG. 6 is a schematic diagram of an implementation process of yet another printer control method provided in an embodiment of the present application. As shown in FIG. 6, the control method includes the following steps S601 to S607.

In S601, upon receiving a nozzle switching instruction from a printer, a depth-sensing LiDAR camera (corresponding to the aforementioned first acquisition device) is controlled to acquire third detection information of a first nozzle.

In S602, the printer is controlled to switch an active nozzle to a second nozzle.

In S603, the depth-sensing LiDAR camera is controlled to acquire fourth detection information of the second nozzle.

In S604, one calibration is performed on the second nozzle based on the third detection information and the fourth detection information.

In S605, the depth-sensing LiDAR camera is controlled to acquire fifth detection information of the second nozzle.

In S606, whether a deviation of the second nozzle falls within a preset deviation range is determined: if yes, proceeding to the following step S607; if no, returning to the step S603.

In S607, the printer is switched to a ready state.

In this embodiment of the present application, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving print quality while guaranteeing that printing results meet high-precision requirements; finally, the first acquisition device can be integrated into existing FDM printers, demonstrating good compatibility and upgradability.

The above controller embodiment is similar to the above method embodiments in description and has similar beneficial effects as the method embodiments. For the technical details undisclosed in the controller embodiment of the present application, reference may be made to the description of the method embodiment of the present application.

It should be noted that in the embodiments of the present application, if the method described above is implemented in the form of a software function module and sold or used as independent products, they can also be stored in a computer-readable storage medium. Based on such understanding, the technical solutions of the embodiments of the present application may essentially, or the portion contributing to the related art may, be embodied in the form of a software product. The software product is stored in a storage medium and includes several instructions configured to cause an electronic device (which may be a personal computer, a server, a network device, or the like) to execute all or part of the method described in each embodiment of the present application. The foregoing storage medium includes various media that can store program code, such as a USB flash drive, a removable hard disk, a read-only memory (ROM), a magnetic disk, or an optical disc. Thus, the embodiments of the present application are not limited to any specific combination of hardware and software.

Figure 7:
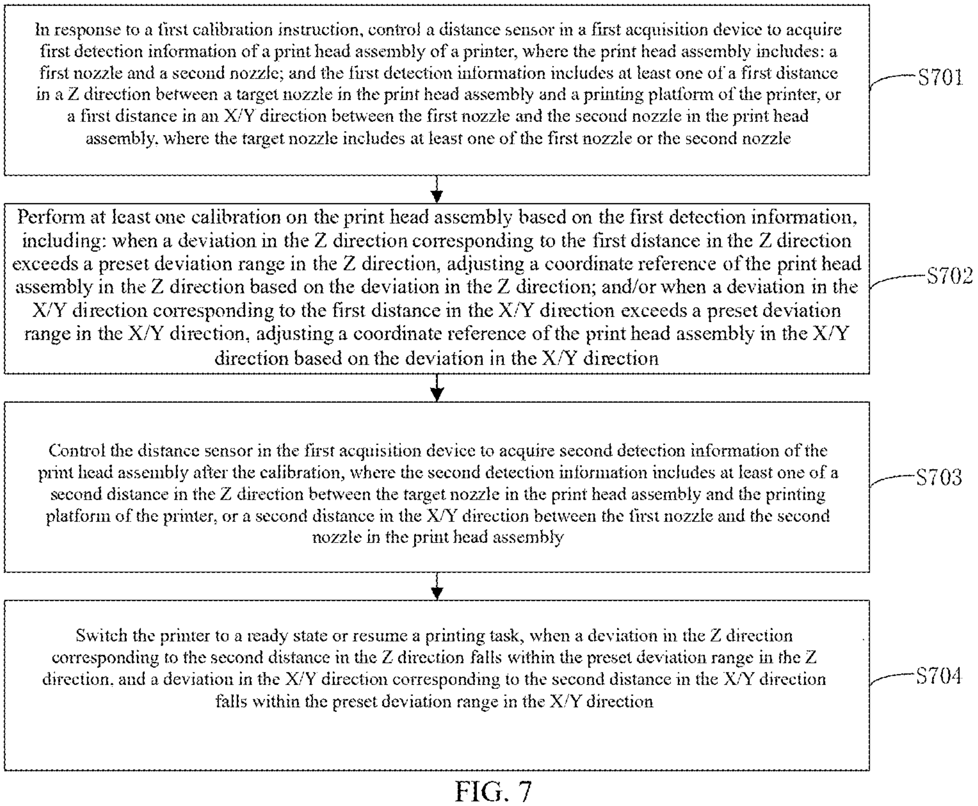
FIG. 7 is a schematic flow chart of a printer control method controlling calibration through a distance sensor provided in an embodiment of the present application.

Referring to FIG. 7, it is a schematic flow chart of a printer control method controlling calibration through a distance sensor provided in an embodiment of the present application. The calibration performed by a controller in a control system of the present application further includes the following steps S701 to S704.

In S701, in response to a first calibration instruction, a distance sensor in a first acquisition device is controlled to acquire first detection information of a print head assembly of a printer, where the print head assembly includes: a first nozzle and a second nozzle; and the first detection information includes at least one of a first distance in a Z direction between a target nozzle in the print head assembly and a printing platform of the printer, or a first distance in an X/Y direction between the first nozzle and the second nozzle in the print head assembly, where the target nozzle includes at least one of the first nozzle or the second nozzle.

In this embodiment of the present application, the first calibration instruction is configured to calibrate the position of the print head assembly in the printer, where the print head assembly includes a first nozzle and a second nozzle; the printer is a dual-nozzle printer; and the first calibration instruction is configured to resolve a physical deviation between the dual nozzles to prevent problems such as text overlapping, image blurring, or non-vertical lines caused by misalignment, for example, by adjusting horizontal and vertical alignment of the dual nozzles through calibrating the print head assembly to ensure consistent output during bidirectional printing.

Herein, the triggering method of the first calibration instruction is not specifically limited, i.e., the first calibration instruction may be actively triggered by a user, for example, the printer is provided with a display screen and a communication module, allowing the user to click “basic calibration” on the display screen to actively trigger the first calibration instruction, or click “basic calibration” on a terminal device such as a mobile phone and transmit it to the printer, with the communication module of the printer receiving the information sent from the mobile phone to actively trigger the first calibration instruction; the first calibration instruction may also be automatically triggered by the printer, for example, the printer is preset to trigger the first calibration instruction every 100 working hours, where the printer automatically triggers the first calibration instruction upon detecting that the printing time has reached 100 hours, so as to prevent position deviations caused by prolonged printing.

In this embodiment of the present application, in response to the first calibration instruction, the printer controls the first acquisition device to acquire first detection information of the print head assembly of the printer, where the first acquisition device in this embodiment of the present application includes at least one of: a distance sensor, a LiDAR camera, a binocular camera, a laser sensor, an infrared sensor, or an image capture card.

Furthermore, in this embodiment of the present application, the types and quantities of sensors arranged in the printer are not limited. Specifically, a plurality of image sensors may be arranged at different positions of the printer, for example, one image sensor may be disposed on a body of the printer to acquire printing information of a printing platform, while another image sensor may be disposed on the print head assembly to monitor nozzle status during printing. As another example, one distance sensor may be disposed on the body of the printer to detect a distance between the dual nozzles in the print head assembly, and another distance sensor may be disposed on the print head assembly to detect a distance between the print head assembly and the printing platform.

In this embodiment of the present application, the first detection device is illustrated by taking the distance sensor as an example, where the first detection information includes distances, specifically including:

- a distance in the X direction between the first nozzle in the print head assembly and a calibration point on the printing platform of the printer;
- a distance in the X direction between the second nozzle in the print head assembly and a calibration point on the printing platform of the printer;
- a distance in the Y direction between the first nozzle in the print head assembly and a calibration point on the printing platform of the printer;
- a distance in the Y direction between the second nozzle in the print head assembly and a calibration point on the printing platform of the printer;
- a distance in the Z direction between the first nozzle in the print head assembly and the printing platform of the printer;
- a distance in the Z direction between the second nozzle in the print head assembly and the printing platform of the printer;
- a distance in the X direction between the first nozzle and the second nozzle in the print head assembly;
- a distance in the Y direction between the first nozzle and the second nozzle in the print head assembly; and
- a distance in the Z direction between the first nozzle and the second nozzle in the print head assembly.

It can be understood that, in this embodiment of the present application, the positional relationship between the dual nozzles in the print head assembly is configured such that: one nozzle of the first nozzle and the second nozzle is fixed while the other nozzle moves relative to the nozzle which is fixed in the direction perpendicular to the horizontal plane; therefore, to facilitate detection, the first detection information in this embodiment of the present application includes at least one of the first distance in the Z direction between the target nozzle in the print head assembly and the printing platform of the printer, or the first distance in the X/Y direction between the first nozzle and the second nozzle in the print head assembly, where the target nozzle includes at least one of the first nozzle or the second nozzle. The quantity of first detection information in this embodiment of the present application is relatively small, enabling rapid calibration.

In this embodiment of the present application, the first detection information may be flexibly configured according to specific calibration scenarios. For example, when the first calibration instruction is to calibrate the first nozzle in the Z direction, the first detection information is the distance in the Z direction between the first nozzle in the print head assembly and the printing platform of the printer; still for example, when the first calibration instruction is to calibrate horizontal alignment between the dual nozzles, the first detection information is the distance in the X/Y direction between the first nozzle and the second nozzle; and also for example, when the first calibration instruction is to calibrate horizontal alignment of the first nozzle, the first detection information is both the distance in the X direction between the first nozzle in the print head assembly and the calibration point on the printing platform of the printer and the distance in the Y direction between the first nozzle in the print head assembly and the calibration point on the printing platform of the printer.

In this embodiment of the present application, the first calibration instruction may be understood as an initial calibration instruction primarily configured to achieve three-dimensional coordinate alignment of the dual nozzles; therefore, when performing targeted calibration on the print head assembly, acquisition of detection information may alternatively be implemented through a sensor other than the distance sensor, such as a LiDAR camera, a binocular camera, a laser sensor, an infrared sensor, an image capture card, or any other sensor for multidimensional information acquisition, which is not limited in this embodiment.

In S702, at least one calibration is performed on the print head assembly based on the first detection information, including: when a deviation in the Z direction corresponding to the first distance in the Z direction exceeds a preset deviation range in the Z direction, adjusting a coordinate system of the print head assembly in the Z direction based on the deviation in the Z direction; and/or when a deviation in the X/Y direction corresponding to the first distance in the X/Y direction exceeds a preset deviation range in the X/Y direction, adjusting a coordinate system of the print head assembly in the X/Y direction based on the deviation in the X/Y direction.

In this embodiment of the present application, the control system determines a deviation of the print head assembly based on the first detection information. Specifically, the control system compares the first detection information with standard detection information and sets a difference between the first detection information and the standard detection information as the deviation of the print head assembly. For example, the controller compares the first distance in the Z direction with a standard distance in the Z direction to obtain the deviation in the Z direction, where the standard distance in the Z direction may be associated with the first calibration instruction or may be a preset distance; and the controller compares the first distance in the X/Y direction with a standard distance in the X/Y direction to obtain the deviation in the X/Y direction, where the standard distance in the X/Y direction may be associated with the first calibration instruction or may be a preset distance.

The deviation in the Z direction refers to a differential distance between the print head assembly (e.g., the first nozzle) and an ideal position or standard position along what is conventionally defined as the Z-axis direction. For example, when a 3D printer's initial height for standard printing (i.e., the ideal distance in the Z direction between the nozzle and the printing platform) is set at 0.2 mm, but the actual distance between a particular nozzle and the printing platform is detected as 0.3 mm, then 0.3 mm−0.2 mm=0.1 mm, which constitutes the deviation in the Z direction (where 0.2 mm is deemed as a standard value, but the actual deviation is determined according to specific conditions).

The deviation in the X/Y direction refers to a differential distance in a planar direction between a relative position of the first nozzle and the second nozzle and an ideal relative position (e.g., alignment, specific spacing, etc.). Typically, the first nozzle and the second nozzle should be perfectly aligned in the X direction (i.e., the deviation in the X direction is 0), but when it is actually detected that the first nozzle is positioned 0.1 mm ahead of the second nozzle in the X direction, then 0.1 mm constitutes the component of the deviation in the X/Y direction (similarly, the deviation in the Y direction represents an analogous concept describing a positional difference along the Y-axis).

In this embodiment of the present application, after the controller obtains the deviation of the print head assembly, the controller compares the deviation with a preset deviation range, where the preset deviation range refers to a maximum error range of the print head assembly, specifically including: a preset deviation range in the Z direction and a preset deviation range in the X/Y direction, for example, the preset deviation range in the Z direction may be set to less than 0.1 mm and the preset deviation range in the X/Y direction may be set to less than 0.2 mm; in this embodiment of the present application, the preset deviation range in the Z direction and the preset deviation range in the X/Y direction may be identical or different.

When the controller determines that both the deviation in the Z direction corresponding to the first distance in the Z direction falls within the preset deviation range in the Z direction, and the deviation in the X/Y direction corresponding to the first distance in the X/Y direction falls within the preset deviation range in the X/Y direction, no deviation calibration processing is performed.

When the controller determines that either the deviation in the Z direction corresponding to the first distance in the Z direction exceeds the preset deviation range in the Z direction, or the deviation in the X/Y direction corresponding to the first distance in the X/Y direction exceeds the preset deviation range in the X/Y direction, the controller controls execution of calibration operations, where the controller, for the deviation existing in the print head assembly (e.g., the first nozzle) in the Z or X/Y direction, performs corrective improvement operations by adjusting the coordinate system through software algorithms.

In this embodiment of the present application, for the deviation in the Z direction, a starting reference point of the print head assembly on the Z axis may be redefined to better conform to a height baseline for actual printing; for the deviation in the X/Y direction, a reference position of the print head assembly on planar coordinate axes is correspondingly corrected to ensure that during subsequent movement and printing, the print head assembly can operate based on adjusted and more accurate positions, thereby achieving high-precision positioning and printing operations, and, just like performing recalibration of the print head assembly with a precise positioning ruler, guaranteeing printing quality and accuracy.

In this embodiment of the present application, upon acquiring the first distance in the Z direction, the position of the print head assembly in the Z direction is precisely adjusted according to the deviation in the Z direction corresponding to the distance to achieve more accurate vertical positioning, thereby ensuring stacking precision of printing materials along the Z-axis. Meanwhile, if the first distance in the X/Y direction exists, the position of the print head assembly in the X/Y direction is further adjusted based on the deviation in the X/Y direction corresponding to the distance to optimize the planar positional relationship of the print head assembly, guaranteeing accuracy and consistency of printed patterns in the horizontal direction; through such calibration means, positioning precision of the print head assembly within a spatial coordinate system is significantly improved, where the precise calibration thereof can ensure smooth progression of the entire printing process.

In S703, the distance sensor in the first acquisition device is controlled to acquire second detection information of the print head assembly after the calibration, where the second detection information includes at least one of a second distance in the Z direction between the target nozzle in the print head assembly and the printing platform of the printer, or a second distance in the X/Y direction between the first nozzle and the second nozzle in the print head assembly.

In this embodiment of the present application, after calibrating the print head assembly, the distance sensor in the first acquisition device acquires second detection information of the print head assembly after the calibration, where the second detection information includes at least one of a second distance in the Z direction between the target nozzle in the print head assembly and the printing platform of the printer, or a second distance in the X/Y direction between the first nozzle and the second nozzle in the print head assembly. The information can reflect deviation conditions of the print head assembly in some critical directions (Z direction, X/Y direction) after calibration compensation.

In this embodiment of the present application, it is detected through the first acquisition device that a target nozzle of the calibrated print head assembly is originally positioned excessively far from the printing platform in the Z direction, and then distance variation data (e.g., changing from a deviation of −0.5 mm to +0.1 mm, where the values such as "−0.5 mm" and "+0.1 mm" constitute components of the second detection information in the Z direction) are detected after calibration compensation; alternatively, a pre-calibration offset of 1 mm is detected in the X direction between the first nozzle and the second nozzle, and after calibration compensation, it is detected that the offset changes to 0.2 mm, that is, by adjusting the position of the print head assembly in this embodiment of the present application, the offset in the X direction transitions from "1 mm" to "0.2 mm", followed by further determination of whether the value of 0.2 mm falls within the deviation range in the X/Y direction.

For example, when a target nozzle's distance from the printing platform in the Z direction exceeds the standard distance by 0.3 mm (indicating a deviation in the Z direction), compensation for the deviation in the Z direction is achieved by adjusting the position of the print head assembly in the Z direction (e.g., lowering the entire print head assembly by 0.3 mm); similarly, when the first nozzle and the second nozzle, which should ideally be aligned in the X direction, exhibit an offset of 0.2 mm (indicating a deviation in the X direction) in actual detection, compensation for the deviation in the X direction is achieved by software-controlled movement of the print head assembly by 0.2 mm in the X direction to establish alignment.

In S704, the printer is switched to a ready state or a printing task is resumed, when a post-compensation deviation of the target nozzle in the Z direction falls within a preset first deviation range, and a post-compensation deviation in the X/Y direction falls within a preset second deviation range.

In this embodiment of the present application, when a deviation in the Z-axis direction ($\Delta Z$)≤a preset first deviation range (e.g., ±0.1 mm) and a composite deviation vector in the X/Y plane ($\sqrt{\Delta X^2+\Delta Y^2}$)≤a preset second deviation range (e.g., ±50 μm), a state switching protocol is triggered, including: first validating torque stability of a servo motor of each axis (maintaining a fluctuation rate <5% over 3 sampling cycles), then transmitting a GRBL "ready" command (M100) to a motion controller while simultaneously clearing offset flag bits in an alarm register, and finally switching a state indicator on an HMI interface from the calibration mode to the printing mode and automatically resuming a print queue (if there are interrupted tasks, it is required to re-perform a cleaning procedure involving 200 mm of pre-extrusion material).

It can be understood that in this embodiment of the present application, the preset second deviation range may be flexibly configured according to calibration requirements, for example, the preset second deviation range may be set as a composite deviation vector in the X/Y plane, or a deviation in the X direction, or a deviation in the Y direction.

In this embodiment of the present application, a high-precision distance sensor is configured to perform real-time detection of Z-axis height and XY-plane position deviations of multiple nozzles while automatically executing dynamic compensation calibration to ensure positioning accuracy of the print head assembly in a three-dimensional space (Z-axis ≤0.05 mm/XY concentricity ≤25 μm), ultimately autonomously resuming printing operations upon meeting strict tolerance conditions, with integrated temperature compensation, vibration filtering, and fault tracing capabilities that significantly enhance reliability and forming accuracy of the multi-nozzle printing system.

While the aforementioned embodiments utilize a distance sensor for detection, different distance sensors exhibit varying detection accuracies. In an embodiment of the present application, the distance sensor includes: a first eddy current sensor disposed on the print head assembly and a second eddy current sensor disposed on the printing platform, and the control method further includes:

1: acquiring the first distance in the Z direction between the target nozzle and the printing platform through the first eddy current sensor, when the first calibration instruction is to calibrate the print head assembly in the Z direction; or 2: acquiring the first distance in the X/Y direction between the first nozzle and the second nozzle through the second eddy current sensor, when the first calibration instruction is to calibrate the print head assembly in the X/Y direction.

In this embodiment of the present application, the distance sensor includes: a first eddy current sensor disposed on the print head assembly, and a second eddy current sensor disposed on the printing platform, where the first eddy current sensor is a non-contact displacement detection device disposed on the print head assembly, operating on the following principle: emitting a high-frequency alternating magnetic field (typical frequency: 1-2 MHz) based on electromagnetic induction principles to measure Z-axis spacing through eddy current effects in the metal platform, with technical parameters as follows: measuring range: 0.5-5 mm; resolution: 0.1 μm; operating temperature: −20° C. to 150° C.

In this embodiment of the present application, the first eddy current sensor disposed on the print head assembly performs non-contact real-time measurement of the distance in the Z direction between the target nozzle and the printing platform (with accuracy reaching 0.1 μm), which achieves the following effects compared to conventional mechanical limit switches or photoelectric sensors: first, completely avoiding nozzle scratching risks caused by contact measurement, particularly suitable for high-temperature (>200° C.) printing environments; second, directly obtaining absolute distance values through electromagnetic induction principles, eliminating measurement errors induced by platform vibration (error reduction by more than 60%); third, increasing the Z-axis calibration speed to millisecond level (typical value: 20 ms/point), which, when combined with dynamic compensation algorithms, enables first-layer printing flatness within ±0.02 mm, significantly improving first-layer adhesion success rates for large printed objects.

The second eddy current sensor, embedded in the printing platform as an auxiliary detection sensor for XY-plane calibration (orthogonally arranged relative to the first eddy current sensor), detects relative positions between the nozzles (concentricity in dual-nozzle mode), where the second eddy current sensor requires heatbed insulation (preventing temperature interference) and grid-based arrangement (3×3 array enhancing detection coverage), thereby enabling accurate acquisition of the first distance in the X/Y direction between the first nozzle and the second nozzle through the second eddy current sensor.

In the technical solution of the present application, the second eddy current sensor embedded in the printing platform performs non-contact detection of relative positions in the XY plane in a multi-nozzle system (detection accuracy: ±5 μm), where a horizontal spacing between the nozzles is directly measured through electromagnetic induction principles, overcoming limitations of conventional optical calibration that is susceptible to material reflectivity interference (calibration success rate improved by 40%); secondly, orthogonally arrayed sensors simultaneously acquire X/Y bidirectional deviation data in a single scan (time consumption <50 ms), demonstrating improved efficiency compared to stepwise calibration; subsequently, when combined with dynamic compensation algorithms, printing concentricity errors of the multi-nozzle system are controlled within ±0.01 mm, perfectly resolving color bleeding issues at material interfaces during multi-material printing.

In an embodiment of the present application, the deviation in the Z direction is a deviation between the first distance in the Z direction and a first standard distance corresponding to the first calibration instruction; and the deviation in the X/Y direction is a deviation between the first distance in the X/Y direction and a second standard distance, where the second standard distance is a distance between the first nozzle and the second nozzle when being aligned in the X/Y direction.

In this embodiment of the present application, the first standard distance refers to a theoretical reference spacing, preset by the system, between the target nozzle and the printing platform when a Z-axis calibration instruction is executed. The parameter serves as a core reference value for calibration algorithms and exhibits the following technical characteristics: dynamic baseline characteristics are not fixed values but dynamically calculated through a material database according to the printing material type (e.g., PLA/ABS), first-layer thickness setting (0.1-0.3 mm), and heatbed temperature (ΔT±5° C.), and are continuously optimized during operation through: periodic triggered contact-probe-assisted validation (once every week) and machine-learning-based corrections based on historical successful printing data (error convergence rate >92%), whereby the standard distance maintains calibration reference stability while adapting to different operational requirements, improving the first-layer printing success rate from 70% to 95% compared to conventional fixed-gap setting methods.

In this embodiment of the present application, under ideal conditions when the first nozzle (N1) and the second nozzle (N2) are perfectly aligned, a center-to-center distance between them in the X/Y plane constitutes the second standard distance; an initial value is calibrated during manufacturing through high-precision optical measurement (e.g., CCD vision system) and stored in a firmware parameter table. During operation, dynamic adjustments are made by incorporating a thermal expansion compensation algorithm to eliminate misalignment between the dual nozzles, ensuring an interlayer alignment error during multi-color/multi-material switching remains ≤±0.01 mm. This process in the present application guarantees that the dual-nozzle system maintains ultra-high concentricity even during high-speed printing, making it suitable for industrial-grade high-precision multi-material 3D printing requirements.

In this embodiment of the present application, a specific method for determining both a deviation in the X direction and a deviation in the X/Y direction is provided, where in the aforementioned embodiment of the present application, since detected distances represent actual values, a calibration value must be set to determine the deviations; the technical solution of the present application enables flexible setting of the calibration value according to a calibration instruction, thereby allowing the print head assembly to achieve accurate printing across different operational scenarios.

In this embodiment of the present application, the eddy current sensors precisely measure an actual distance (in the Z direction) between the print head assembly and the printing platform, and relative positions (in the X/Y direction) between multiple nozzles, and these measurements are compared with preset standard distances to automatically calculate three-dimensional spatial deviations (deviation in the Z direction=measured distance−standard distance; deviation in the X/Y direction=measured nozzle spacing−theoretical alignment distance); when the deviations exceed thresholds, high-precision dynamic compensation is triggered, ultimately enabling the print head assembly to achieve micron-level calibration requirements for both Z-axis positioning accuracy and XY-plane concentricity (typical values: $Z \leq \pm 0.05$ mm, $XY \leq \pm 0.02$ mm), thereby realizing rapid self-calibration of the printing system and restoration of stable printing conditions while effectively eliminating multi-dimensional positioning errors caused by thermal deformation, mechanical wear, and the like.

In an embodiment of the present application, the control method further includes: adjusting a position of the target nozzle in the Z direction and a coordinate reference of the target nozzle in the Z direction based on a compensation parameter in the Z direction corresponding to the deviation in the Z direction, where the compensation parameter in the Z direction is determined based on the deviation in the Z direction and a preset first mapping relationship; and adjusting the position of the print head assembly in the X/Y direction and a coordinate reference of the print head assembly in the X/Y direction based on a compensation parameter in the X/Y direction corresponding to the deviation in the X/Y direction, where the compensation parameter in the X/Y direction is determined based on the deviation in the X/Y direction and a preset second mapping relationship.

In this embodiment of the present application, upon detecting a deviation in the Z direction ($\Delta Z$), the system automatically matches a compensation parameter through a preset nonlinear compensation mapping table, and the mapping relationship comprehensively considers: nozzle temperature (with 10° C. intervals between 200-300° C.), platform material (with a difference of ±15% between metal/glass compensation coefficients), and historical wear data (corrected by cumulative printing hours). Through an intelligent nonlinear compensation mechanism in the technical solution of the present application, the detected deviation in the Z direction ($\Delta Z$) is automatically converted into a high-precision compensation parameter, which undergoes dynamic correction by incorporating multidimensional data such as temperature, material, and mechanical wear to achieve micron-level Z-axis positioning calibration accuracy (error $\leq \pm 0.005$ mm). The entire compensation process is completed rapidly within 150 ms while ensuring stability through closed-loop control and redundancy check, simultaneously continuously optimizing an adaptive database to significantly improve first-layer printing flatness and long-term calibration reliability, particularly suitable for high-precision industrial-grade 3D printing applications.

In the technical solution of the present application, a preset second mapping relationship (incorporating nozzle temperature compensation coefficients, mechanical backlash correction factors, and material shrinkage parameters) converts the detected deviation in the X/Y direction ($\Delta X/\Delta Y$) into a high-precision compensation parameter; through an intelligent X/Y-direction dynamic compensation system in this embodiment of the present application, the detected position deviation of the nozzle ($\Delta X/\Delta Y$) is combined with multiple factors such as temperature, material characteristics, and mechanical parameters to generate an optimal compensation parameter in real-time through the preset second mapping relationship, enabling position adjustment of the print head assembly at an ultra-high precision of 0.002 mm, thereby stably controlling concentricity errors of the multi-nozzle system within ±0.008 mm. This solution not only effectively resolves interlayer misalignment and color bleeding issues in multi-material printing but also continuously optimizes compensation accuracy through adaptive learning algorithms, significantly improving geometric precision and surface quality of color 3D printed objects, making it particularly suitable for demanding industrial-grade high-precision multi-color printing applications.

In this embodiment of the present application, when it is determined that a deviation of the target nozzle in the Z direction exceeds a deviation range, positional information of the target nozzle in the Z direction is adjusted; and when it is determined that a deviation of the print head assembly in the X/Y direction exceeds a deviation range, positional information of the print head assembly in the X/Y direction is adjusted, followed by performing secondary detection on the adjusted print head assembly until the deviation of the target nozzle in the Z direction falls within the deviation range, and the positional information of the print head assembly in the X/Y direction falls within the deviation range, at which point the adjustment is terminated.

Furthermore, since the print head assembly is preconfigured with a coordinate system, positional adjustment of the print head assembly may cause coordinate deviation; therefore, this embodiment of the present application may further adjust a coordinate reference of the print head assembly, specifically including: when it is determined that a deviation of the target nozzle in the Z direction exceeds a deviation range, first adjusting positional information of the target nozzle in the Z direction, and subsequently updating a coordinate reference of the target nozzle in the Z direction; and when it is determined that an deviation of the print head assembly in the X/Y direction exceeds a deviation range, first adjusting positional information of the print head assembly in the X/Y direction, and subsequently updating an coordinate reference of the print head assembly in the X/Y direction until the deviation of the target nozzle in the Z direction falls within the deviation range, and the positional information of the print head assembly in the X/Y direction falls within the deviation range, at which point the coordinate system of the print head assembly achieves alignment.

Those skilled in the art can appreciate that: position adjustment of the print head assembly and coordinate reference adjustment of the print head assembly may be performed separately, for example: adjusting the position of the print head assembly separately, or adjusting the coordinate reference of the print head assembly separately; or position adjustment of the print head assembly and coordinate reference adjustment of the print head assembly may be performed sequentially, for example: first adjusting the position of the print head assembly followed by adjusting the coordinate reference of the print head assembly; alternatively, position adjustment of the print head assembly and coordinate reference adjustment of the print head assembly may be performed may be performed simultaneously, for example: those skilled in the art may adjust the position and coordinate reference of the print head assembly simultaneously based on the deviation of the print head assembly.

In this embodiment of the present application, position adjustment of the print head assembly may be mechanical adjustment, while coordinate reference adjustment of the print head assembly may be software adjustment; during nozzle deviation adjustment, both mechanical adjustment and software adjustment may be combined to reduce the deviation of the print head assembly.

It should be additionally noted that in this embodiment of the present application, compensation parameters are also configured for deviation compensation, that is, this embodiment of the present application may reduce deviations not only through position adjustment but also through mechanical adjustment; during execution of mechanical adjustment compensation, for example, a motion controller adjusts a Z-axis motor with a microstep of 0.001 mm while simultaneously suppressing mechanical backlash in real-time through PID closed-loop control (proportional gain Kp=0.8, integral time Ti=2 ms), and triggers redundancy check for 3 times (sampling interval: 50 ms) upon completing compensation to ensure final Z-axis positioning error ≤±0.005 mm; moreover, the compensation parameters are dynamically updated to an adaptive learning database for optimizing subsequent calibration efficiency.

Figure 8:
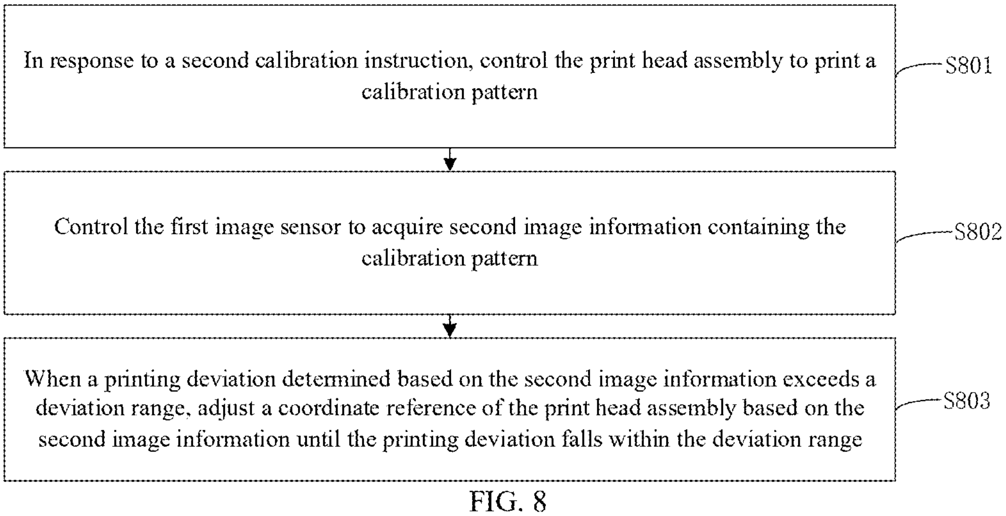
FIG. 8 is a schematic flow chart of another printer control method controlling calibration through visual analysis provided in an embodiment of the present application.

Referring to FIG. 8, it is a schematic flow chart of another printer control method controlling calibration through visual analysis provided in an embodiment of the present application. In an embodiment of the present application, the first acquisition device includes a first image sensor disposed on a body of the printer, and the control method further includes the following steps S801 to S803.

In S801, in response to a second calibration instruction, the print head assembly is controlled to print a calibration pattern.

In this embodiment of the present application, a second calibration instruction is configured to calibrate the position of the print head assembly in the printer, where the second calibration instruction in this embodiment of the present application and the first calibration instruction in the aforementioned embodiment share the same objective of improving printing quality of the printer, but differ in that the first calibration instruction performs calibration through parameters acquired by specific sensors, while the second calibration instruction in this embodiment of the present application performs calibration through image information acquired by an image sensor.

Upon receiving the second calibration instruction in this embodiment of the present application, a calibration procedure is immediately initiated: first controlling the print head assembly to print a preset cross-grid calibration pattern (line width: 0.4 mm, layer height: 0.1 mm) in a central area of the printing platform, while simultaneously activating an integrated vision system to scan geometric features of a model at a frame rate of 200 fps, analyzing line coincidence and corner distortion rates in real-time through deep learning algorithms to generate within 10 s a compensation matrix incorporating 12 parameters including XY-axis scaling ratios and belt backlash, ultimately automatically updating a nonlinear compensation parameter table of the motion controller. The entire process is completed within 30 s without manual intervention, thereby enhancing dynamic printing accuracy of the multi-nozzle system to a level of ±15 μm.

It can be understood that the calibration pattern in this embodiment of the present application may be configured according to specific scenarios, where the calibration pattern constitutes a specific geometric structure for printer calibration, employing high-contrast cross grids, concentric circles, or stepped patterns (with an adjustable line width of 0.2-0.6 mm) to create characteristic edges through precisely controlled extrusion amounts, typically including: X/Y-axis orthogonal line segments (for detecting axial scaling deviations), 45° diagonal edges (for measuring belt backlash and transmission nonlinearity), and multi-layer stacked structures (for evaluating Z-axis stepping consistency), where geometric deformation amounts of the calibration pattern (e.g., line misalignment of ±5 μm) directly reflect actual errors of the mechanical system, providing a quantified compensation basis for visual algorithms.

In S802, the first image sensor is controlled to acquire second image information containing the calibration pattern.

In this embodiment of the present application, upon completion of calibration pattern printing, the printer immediately triggers the first image sensor to acquire second image information of the calibration pattern in macro mode: first performing 3×3 grid-based zonal capturing (15% overlap per zone), then eliminating reflection interference through exposure blending, followed by GPU-accelerated distortion correction algorithms to remove lens deformation, ultimately outputting image data in a target format.

In S803, when a printing deviation determined based on the second image information exceeds a deviation range, a position of the print head assembly is adjusted based on the second image information until the printing deviation falls within the deviation range.

When image analysis results of the calibration pattern in this embodiment of the present application exceed preset deviation thresholds, a multi-stage compensation process is automatically triggered: first parsing geometric distortion features in the image (such as line offsets and angular deviations) through vision algorithms to generate a compensation matrix incorporating axial scaling ratios and orthogonality errors; then converting the matrix into motion parameter corrections for the print head assembly to dynamically adjust X/Y/Z-axis positions (including stepper motor microstepping and belt tension compensation); after each adjustment, reprinting a verification model and acquiring new images for closed-loop check until geometric feature errors of the calibration pattern converge within allowable ranges, ultimately locking optimized mechanical parameters and updating printer calibration configuration files.

In this embodiment of the present application, an intelligent dynamic calibration of the position of the print head assembly is achieved through a vision feedback closed-loop control system: when image analysis detects printing deviations exceeding allowable ranges, the printer automatically parses deviation features and generates precise compensation parameters, rapidly converging printing accuracy to a value within a preset standard range through iterative adjustments of nozzle motion parameters and mechanical compensation values; this process not only eliminates systematic deviations caused by mechanical transmission errors and thermal deformation, but also ensures calibration reliability through closed-loop verification mechanisms, ultimately improving comprehensive positioning accuracy of the multi-axis printing system.

In an embodiment of the present application, the control method further includes: controlling the first nozzle in the print head assembly to print the first calibration pattern, and controlling the second nozzle in the print head assembly to print the second calibration pattern; acquiring the first calibration pattern and the second calibration pattern through the first image sensor to obtain the second image information; and determining a printing deviation of the print head assembly in a first direction corresponding to a first parallel line segment group in the second image information based on the first parallel line segment group, where two parallel lines in the first parallel line segment group are located in the first calibration pattern and the second calibration pattern respectively.

In this embodiment of the present application, pre-designed geometric patterns (e.g., parallel lines, intersecting lines, grids, etc.) are utilized to evaluate printing accuracy and alignment of the nozzles, where the first calibration pattern includes a first line in a group of parallel lines, and the second calibration pattern includes a second parallel line corresponding to the first calibration pattern for comparing offset therebetween, for example, when two parallel lines with a theoretical spacing of 0.1 mm therebetween are actually printed with a spacing of 0.12 mm, it indicates a deviation of 0.02 mm.

In this embodiment of the present application, the first calibration pattern and the second calibration pattern may be identical or different, for example: the first calibration pattern may be a grid and the second calibration pattern may also be a grid with identical grid dimensions, where each of the first calibration pattern and the second calibration pattern contains one line segment, forming a parallel line segment group, and the parallel line segments in this embodiment of the present application enable convenient and rapid deviation identification.

In an embodiment of the present application, the control method further includes: controlling the first nozzle in the print head assembly to print the first calibration pattern, and controlling the second nozzle in the print head assembly to print the second calibration pattern; acquiring the first calibration pattern and the second calibration pattern through the first image sensor to obtain the second image information; and identifying a comparison group consisting of two theoretically parallel line segments in the first calibration pattern and the second calibration pattern in the second image information. If two lines are actually non-parallel or are not spaced as expected, it indicates nozzle misalignment or mechanical errors. By comparing an actual spacing between two parallel lines with a theoretical spacing and converting it to a physical deviation value using pixel calibration parameters, for example: when a line segment printed by the first nozzle shifts rightward while a line segment printed by the second nozzle shifts leftward, the spacing therebetween increases, enabling the system to calculate a corresponding deviation value based thereon.

In this embodiment of the present application, dual nozzles alternately print calibration patterns followed by high-precision image acquisition, where a closed-loop process of deviation analysis for parallel line groups based on acquired image information and subsequent dynamic calibration achieves high-precision alignment of the print head assembly. This method realizes non-contact, high-precision nozzle alignment calibration, effectively solves misalignment problems in multi-nozzle printing systems, and significantly improves printing quality and consistency, while simultaneously simplifying the calibration process and enhancing production efficiency.

In some embodiments, the calibration pattern further includes a third calibration pattern and a fourth calibration pattern, and the control method further includes: when the adjusting the position of the print head assembly has been completed, controlling the first nozzle in the print head assembly to print the third calibration pattern, and controlling the second nozzle in the print head assembly to print the fourth calibration pattern; acquiring the third calibration pattern and the fourth calibration pattern through the first image sensor to obtain third image information; determining a printing deviation of the print head assembly in a second direction corresponding to a second parallel line segment group in the third image information based on the second parallel line segment group, where the first direction and the second direction are different; and controlling the calibration of the print head assembly to be terminated based on the printing deviation in the first direction and the printing deviation in the second direction.

In this embodiment of the present application, the third calibration pattern and the fourth calibration pattern are pre-designed geometric patterns (e.g., parallel lines, intersecting lines, grids, etc.) for evaluating printing accuracy and alignment of nozzles, where the first calibration pattern, the second calibration pattern, the third calibration pattern, and the fourth calibration pattern may be completely identical, partially identical, or entirely different; it can be understood that the first calibration pattern, the second calibration pattern, the third calibration pattern, and the fourth calibration pattern are primarily configured for nozzle calibration, with shapes of the first calibration pattern, the second calibration pattern, the third calibration pattern, and the fourth calibration pattern being determined based on rapid printing capability of the print head assembly.

It can be understood that in this embodiment of the present application, the first nozzle is configured to print the first calibration pattern and the third calibration pattern while the second nozzle is configured to print the second calibration pattern and the fourth calibration pattern, where under normal circumstances, when a printing filament corresponding to the first nozzle differs from a printing filament corresponding to the second nozzle, or when a dimension of the first nozzle differs from a dimension of the second nozzle, at least one characteristic among color, material, or thickness differs between the printed first calibration pattern and the printed second calibration pattern; and at least one characteristic among color, material, or thickness differs between the printed third calibration pattern and the printed fourth calibration pattern.

In this embodiment of the present application, digitized data of the third and fourth calibration patterns acquired by the first image sensor is used to analyze a deviation in the second direction. The printer determines whether deviation values in the first direction (X-axis) and the second direction (Y-axis) meet precision thresholds to decide on calibration termination, for example, terminating calibration when a deviation in the X-axis direction ≤0.01 mm and a deviation in the Y-axis direction ≤0.01 mm, otherwise continuing nozzle position adjustments.

In an embodiment, the first nozzle is controlled to print the first calibration pattern (e.g., a horizontal line segment) and the second nozzle is controlled to print the second calibration pattern (e.g., parallel horizontal line segments); images of both are captured through the first image sensor to obtain second image information; a first parallel line segment group is extracted from the images to calculate a difference between an actual spacing and a theoretical spacing in the X-axis direction, thereby determining a deviation in the X-axis direction (e.g., +0.02 mm); and micro-adjustments are performed to either an X-axis motor of the print head assembly or software coordinate offsets based on the deviation.

In this embodiment of the present application, for verification in the first direction: after confirming that a deviation in the X-axis direction has been corrected within a threshold (e.g., ±0.005 mm), secondary calibration (in the second direction) is further controlled to print the third calibration pattern (e.g., a vertical line segment) and the fourth calibration pattern (parallel vertical line segments) using the calibrated print head assembly; third image information is acquired by capturing both the patterns through the same image sensor; and a second parallel line segment group is extracted to calculate the deviation in the X-axis direction (e.g., −0.015 mm) for multidimensional evaluation, where if the deviation in the X-axis direction ≤0.01 mm and the deviation in the Y-axis direction ≤0.01 mm→the calibration is complete; or if the deviation in either direction exceeds the deviation range, the system returns to adjustment procedures in the corresponding direction. Through dynamic adjustments in this embodiment of the present application, target accuracy is progressively approached.

In this embodiment of the present application, the control method employs a stepwise calibration approach by first adjusting the printing deviation of the print head assembly in the first direction (e.g., X-axis), then printing the third and fourth calibration patterns to detect the deviation in the second direction (e.g., Y-axis or an oblique direction), and utilizing an image sensor to acquire parallel line segment group information in different directions, thereby achieving multi-dimensional precise calibration. This method can not only efficiently identify and correct nozzle misalignment problems in orthogonal or specific angular directions, but also dynamically control calibration termination conditions through comprehensive evaluation of deviations in both directions, ensuring optimal alignment accuracy of the print head assembly. This closed-loop calibration mechanism significantly improves overall alignment precision of multi-nozzle printing systems, reduces repeated adjustment cycles, and prevents multi-dimensional errors from interfering with each other, while adapting to high-precision requirements for complex printing tasks, ultimately enhancing consistency and yield rate of printed products.

In some embodiments, the first acquisition device further includes a laser sensor and a second image sensor disposed on the print head assembly, and the control method further includes: emitting laser light toward a printed calibration pattern through the laser sensor; and performing image acquisition on a laser light-exposed calibration pattern through the second image sensor to obtain the second image information.

In this embodiment of the present application, a multi-sensor system on the print head assembly is configured for high-precision calibration data acquisition, where the first acquisition device includes: a laser sensor disposed on the print head assembly and a second image sensor, where the laser sensor is configured to emit structured laser light (e.g., linear laser light) onto a printing surface; and the second image sensor includes a dedicated optical acquisition module operating cooperatively with the laser sensor. The technical solution of the present application enhances weak feature recognition capability through laser assistance compared to single visual detection.

In this embodiment of the present application, upon printing completion, the laser sensor instantaneously emits linear laser light to illuminate the first/second calibration pattern, where a width of the linear laser light is controlled within 50-100 μm to cover critical features of the calibration pattern; further, the second image sensor captures a shape of the linear laser light with microsecond-level exposure time.

In this embodiment of the present application, when laser detection data of the laser sensor differs from detection data of the image sensor, the laser detection data is preferentially adopted; however, when the linear laser light exhibits breaks or offsets due to height variations, this embodiment of the present application may perform information fitting correction through a neural network model to obtain accurate image information for deviation detection of the print head assembly.

In this embodiment of the present application, the control method employs coordinated operation between the laser sensor and the second image sensor integrated on the print head assembly, utilizing laser light illumination of a calibration pattern combined with acquisition of a reflected image by the second image sensor to enhance feature recognition accuracy of the calibration pattern, particularly under low-contrast or complex background conditions. The directional projection of laser light highlights edges and geometric features of the calibration pattern, while the high-resolution acquisition of the second image sensor further improves the signal-to-noise ratio and detail reconstruction capability of the image information, thereby enabling more precise detection of position deviations or printing defects of the nozzles. This active optical detection solution significantly improves the robustness and adaptability of the calibration system, particularly suitable for dynamic calibration requirements of high-precision industrial-grade printing equipment, effectively reducing ambient light interference while improving calibration efficiency.

In an embodiment of the present application, the adjusting the position of the print head assembly based on the second image information until the printing deviation falls within the deviation range in S803 specifically includes the following steps 1 to 2.

In step 1, printing information of the print head assembly is determined based on the second image information, where the printing information includes at least one of a printing height, in the Z direction, of a target line in the second image information, or a printing length, in the X/Y direction, of the target line in the second image information.

In step 2, the position of the print head assembly and a coordinate reference of the print head assembly are adjusted based on a printing deviation corresponding to the printing information, where the printing deviation includes at least one of a deviation between the printing height in the Z direction and a theoretical height of the calibration pattern in the Z direction, or a deviation between the printing length in the X/Y direction and a theoretical length of the calibration pattern in the X/Y direction.

In this embodiment of the present application, the second image information is analyzed through machine vision algorithms to extract key geometric features from the calibration pattern: first identifying an imaging edge contour of a target line to calculate its actual printing height (a layer thickness deviation in the Z direction) and printing length (a scaling error in the X/Y direction); then combining with a preset theoretical dimension of the calibration pattern to quantify an actual printing deviation of the print head assembly in a three-dimensional space; automatically calculating a compensation value for the print head assembly along each coordinate axis and adjusting its position; subsequently, based on the position-adjusted print head assembly, progressively correcting a systematic deviation caused by mechanical transmission errors and thermal deformation through dynamic adjustment of a reference coordinate parameter of the print head assembly, ultimately achieving complete correspondence between actual printed dimensions and theoretical geometric features of the calibration pattern.

Figure 9:
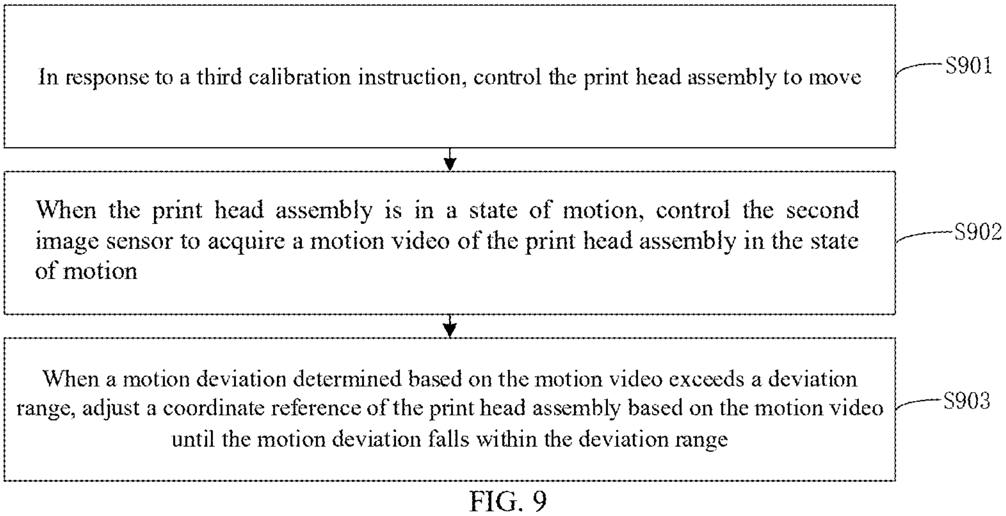
FIG. 9 is a schematic flow chart of yet another printer control method controlling calibration through motion analysis provided in an embodiment of the present application.

Referring to FIG. 9, it is a schematic flow chart of yet another printer control method controlling calibration through motion analysis provided in an embodiment of the present application. In an embodiment of the present application, the first acquisition device includes a second image sensor disposed on the print head assembly, and the control method further includes the following steps S901 to S903.

In S901, in response to a third calibration instruction, the print head assembly is controlled to move.

In this embodiment of the present application, upon receiving a third calibration instruction, a motion calibration process of the print head assembly is immediately initiated: first controlling the print head assembly to perform uniform-speed scanning along a predetermined three-dimensional spatial trajectory (incorporating X/Y/Z-axis composite motion), while simultaneously acquiring actual position data of each axis in real-time through a high-precision encoder; subsequently performing comparative analysis between a measured value of the motion trajectory and a theoretical path to identify nonlinear deviations such as backlash and step errors in the mechanical transmission system; ultimately automatically correcting interpolation algorithm parameters of the motion controller based on a dynamically established error compensation table to achieve micron-level positioning accuracy of the print head assembly during actual operation, specifically:

In S902, when the print head assembly is in a state of motion, the second image sensor is controlled to acquire a motion video of the print head assembly in the state of motion.

In this embodiment of the present application, when motion calibration of the print head assembly is executed, the printer simultaneously activates the high-speed second image sensor (frame rate ≥1000 fps) for dynamic acquisition: locking onto a feature marker point of the print head assembly through a preset tracking algorithm to continuously record its spatial trajectory during XYZ three-axis composite motion, and combining timestamp and encoder data to generate a kinematic analysis report (including parameters such as instantaneous velocity, acceleration, and vibration amplitude), thereby providing a millimeter-precision dynamic behavior database for subsequent motion control optimization, with the entire process automatically terminating upon completion of the motion calibration and generating a visual analysis chart.

In S903, when a motion deviation determined based on the motion video exceeds a deviation range, a position of the print head assembly is adjusted based on the motion video until the motion deviation falls within the deviation range.

In this embodiment of the present application, when it is detected through motion video analysis that an actual motion trajectory of the print head assembly (including vibration amplitude, axial deviation, or speed fluctuation) exceeds a preset deviation threshold, a dynamic compensation mechanism is automatically triggered: first extracting spatiotemporal coordinates of feature points from video frame sequences to construct a three-dimensional motion error model; then generating corresponding compensation parameters according to deviation types (such as mechanical resonance or stepping misalignment) to adjust PID control parameters of servo motors and motion interpolation algorithms in real-time; and after each adjustment, re-executing motion calibration and acquiring new videos for verification until dynamic motion accuracy of the print head assembly (including trajectory smoothness and positioning repeatability) stably converges within an allowable range, ultimately updating a reference parameter database of the motion controller and generating a calibration report.

In this embodiment of the present application, closed-loop motion accuracy control of the print head assembly is achieved through dynamic visual feedback: when executing the third calibration instruction, the system synchronously drives motion of the print head assembly with high-speed image acquisition (1000 fps), automatically generates compensation parameters by analyzing real-time trajectory deviations (including vibration, offset, and other parameters) in motion videos, and dynamically adjusts servo control algorithms to reduce positioning errors of the print head assembly during high-speed motion from an initial value of ±0.1 mm to a value within ±0.01 mm, with the entire compensation process being fully automated without manual intervention. This machine vision-based online calibration technology effectively addresses the limitation of conventional static calibration in capturing dynamic errors, thereby improving printing accuracy.

In an embodiment of the present application, the control method further includes:

- controlling the second image sensor to acquire target encoding information from a visual encoding plate below the print head assembly, and setting at least two frames of images containing the target encoding information as the motion video, where the visual encoding plate is detachably arranged on the printing platform of the printer and includes at least two pieces of encoding information; and the target encoding information is configured to calibrate a relative position between the print head assembly and the printing platform of the printer.

In this embodiment of the present application, high-precision dynamic calibration is achieved through a detachable visual encoding plate: during motion of the print head assembly, the visual encoding plate (containing multiple sets of absolute position encoding patterns) fixed on the printing platform is continuously captured by the second image sensor at a frame rate of 500 fps, where the system selects at least two key frames of images containing different encoding information (interval ≥10 ms), extracts absolute coordinate data (accuracy ±5 μm) from the visual encoding plate through a decoding algorithm, and combines a correlation between timestamps and motion trajectories of the print head assembly to calculate three-dimensional relative position deviations between the print head assembly and the platform (including Z-axis height and XY-plane offset) in real-time, thereby providing a sub-micron-level reference for dynamic compensation, with the entire process completed within 200 ms while supporting hot-swapping of encoding plates, making it particularly suitable for rapid re-calibration in multi-material printing scenarios.

The adjusting the position of the print head assembly based on the motion video further includes the following steps 1 to 3.

In step 1, a motion trajectory of the print head assembly is determined based on the target encoding information in the at least two frames of images in the motion video.

In this embodiment of the present application, encoding recognition is performed on acquired consecutive image frames (≥2 frames) to extract pixel coordinates of preset absolute position marker points on the visual encoding plate in each frame; subsequently, by combining physical dimension parameters of the encoding plate (e.g., a known encoding pitch of 0.5 mm) and camera calibration data (intrinsic matrix and distortion coefficients), three-dimensional spatial coordinates (X/Y/Z) of the print head assembly relative to the encoding plate are resolved through PnP algorithms; finally, based on timestamps, B-spline curve fitting is applied to multi-frame coordinate points to reconstruct a complete six-degree-of-freedom trajectory of the print head assembly during motion (including positions and attitude angles), achieving a trajectory reconstruction accuracy of ±3 μm@100 mm/s, thereby providing a high-confidence kinematic data basis for subsequent deviation analysis.

In step 2, a motion deviation of the print head assembly is determined based on the motion trajectory and a standard trajectory corresponding to the third calibration instruction.

In this embodiment of the present application, the reconstructed actual motion trajectory is spatiotemporally aligned with a standard trajectory preset by the third calibration instruction (containing theoretical values across time-position-velocity domains), using a Dynamic Time Warping (DTW) algorithm to eliminate timing jitter effects; subsequently, at key feature points (e.g., corners, acceleration/deceleration intervals), three-dimensional position deviations (ΔX, ΔY, ΔZ) and attitude angle offsets (ΔRoll, ΔPitch, ΔYaw) are calculated, while periodic fluctuation components caused by mechanical resonance are extracted through frequency-domain analysis; ultimately, a composite deviation report incorporating both static errors (e.g., backlash) and dynamic errors (e.g., vibration amplitude) is generated with a precision of ±1 μm, thereby providing multidimensional data support for motion compensation.

In step 3, the position of the print head assembly and a coordinate reference of the print head assembly are adjusted based on a motion compensation parameter corresponding to the motion deviation.

In this embodiment of the present application, multidimensional compensation parameters are automatically generated based on a motion deviation report, including: position compensation values for X/Y/Z axes (stepping resolution: 0.001 mm), dynamic PID gains for servo motors (Kp=0.6, Ki=0.02, Kd=0.1), and vibration suppression filter parameters (cutoff frequency: 80 Hz); subsequently, the compensation parameters are injected into a motion controller via a real-time control bus (EtherCAT, cycle ≤1 ms), where the controller adjusts both the position of the print head assembly and the coordinate reference of the print head assembly according to the compensation values, completing dynamic loading of all parameters before a next motion cycle; finally, a confirmatory trajectory scan is triggered to confirm compensation effectiveness through secondary measurement.

In the technical solution of the present application, micron-level motion trajectory calibration of the print head assembly is achieved through dynamic tracking of the visual encoding plate: the printer precisely reconstructs three-dimensional motion trajectories of the print head assembly by decoding absolute position encoding information from consecutive frames, performs real-time comparison with standard trajectories, and automatically calculates motion deviations including parameters such as axial offset and speed fluctuation, based on which compensation parameters are dynamically generated to correct servo control parameters (e.g., PID gains and stepping microsteps), reducing deviations between actual motion trajectory and theoretical paths from an initial value of ±50 μm to a value within ±2 μm, with compensation response time less than 100 ms. This absolute-encoding-based closed-loop calibration method not only overcomes the defects of cumulative errors in conventional relative encoding, but also can adapt to the rapid recalibration requirements across different printing platforms (such as high-temperature heatbeds or flexible substrates).

An embodiment of the present application provides a printer, including: a first acquisition device, a print head assembly, a processor and a memory, where the print head assembly includes a first nozzle and a second nozzle; and the memory stores thereon a computer program executable on the processor, where the processor, when executing the computer program, control the print head assembly to, in response to a control system of the print, implement the control method described above.

In some embodiments, the printer is further configured to: in response to a first calibration instruction, control a distance sensor in the first acquisition device to acquire the first detection information of the print head assembly of the printer, where the first detection information includes at least one of a first distance in a Z direction between a target nozzle in the print head assembly and a printing platform of the printer, or a first distance in an X/Y direction between the first nozzle and the second nozzle in the print head assembly, where the target nozzle includes at least one of the first nozzle or the second nozzle; perform at least one calibration on the print head assembly based on the first detection information, including: when a deviation in the Z direction corresponding to the first distance in the Z direction exceeds a preset deviation range in the Z direction, adjusting a position of the print head assembly in the Z direction based on the deviation in the Z direction; and/or when a deviation in the X/Y direction corresponding to the first distance in the X/Y direction exceeds a preset deviation range in the X/Y direction, adjusting a position of the print head assembly in the X/Y direction based on the deviation in the X/Y direction; control the distance sensor in the first acquisition device to acquire second detection information of the print head assembly after the calibration, where the second detection information includes at least one of a second distance in the Z direction between the target nozzle in the print head assembly and the printing platform of the printer, or a second distance in the X/Y direction between the first nozzle and the second nozzle in the print head assembly; and switch the printer to the ready state or resume the printing task, when a deviation in the Z direction corresponding to the second distance in the Z direction falls within the preset deviation range in the Z direction, and a deviation in the X/Y direction corresponding to the second distance in the X/Y direction falls within the preset deviation range in the X/Y direction.

An embodiment of the present application provides a computer-readable storage medium having a computer program stored thereon, where the computer program, when executed by a processor, implements the control method described above. The computer-readable storage medium may be transitory or non-transitory.

An embodiment of the present application provides a computer program product, including a non-transitory computer-readable storage medium storing a computer program, where the computer program, when read and executed by a computer, implements some or all steps of the aforementioned method. The computer program product may be specifically implemented through hardware, software, or a combination thereof. In one optional embodiment, the computer program product is specifically embodied as a computer storage medium; in another optional embodiment, the computer program product is specifically embodied as a software product, such as a software development kit (SDK) and the like.

Figure 10:
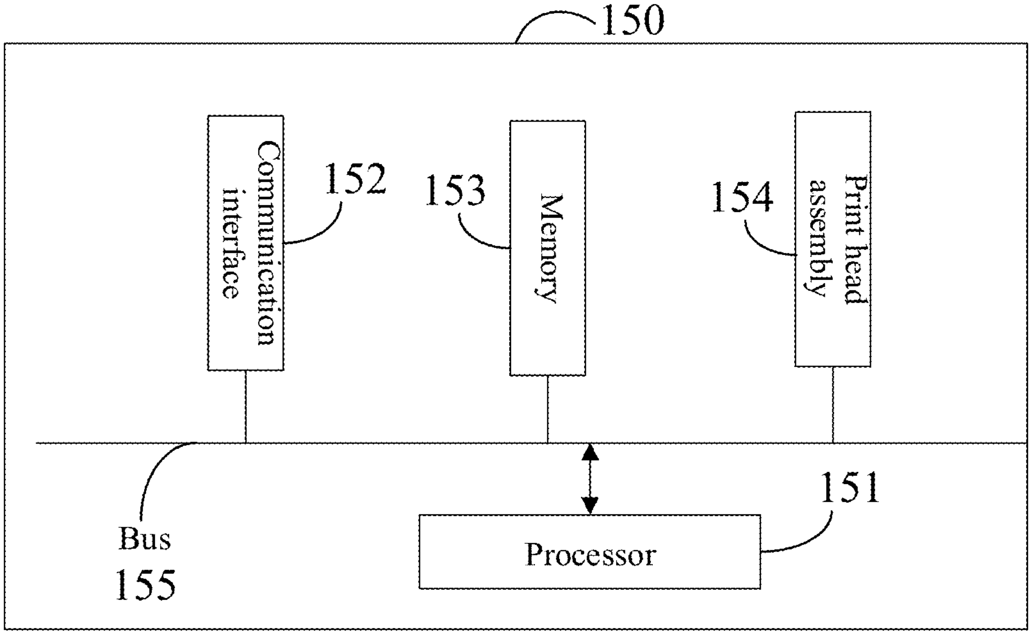
FIG. 10 is a schematic diagram of a hardware entity of a printer provided in an embodiment of the present application.

It should be noted that FIG. 10 is a schematic diagram of a hardware entity of a printer provided in an embodiment of the present application. As shown in FIG. 10, the hardware entity of printer 150 includes: a processor 151, a communication interface 152, a memory 153, and a print head assembly 154.

The processor 151 typically controls overall operations of the printer 150.

The communication interface 152 enables the printer 150 to communicate with other terminals or servers via a network.

The memory 153 is configured to store instructions and applications executable by the processor 151, and may also cache data to be processed or already processed by the processor 151 and various modules of the printer 150 (e.g., image data, audio data, voice communication data, and video communication data). It may be implemented through a flash memory (FLASH) or random access memory (RAM); and data transmission between the processor 151, the communication interface 152, the memory 153, and the print head assembly 154 may be performed via a bus 155.

It should be noted that the above storage medium and device embodiments are similar to the above method embodiments in description and have similar beneficial effects as the method embodiments. For technical details not disclosed in the storage medium and device embodiments of the present application, reference may be made to the description of the method embodiments of the present application.

It should be understood that "one embodiment" or "an embodiment" mentioned in the specification means that the specific features, structures, or characteristics related to the embodiment are included in at least one embodiment of the present application. Therefore, "in one embodiment" or "in an embodiment" appearing in various places of the specification does not necessarily refer to the same embodiment. In addition, these specific features, structures, or characteristics may be combined in one or more embodiments in any suitable manner. It should be understood that the serial number of each step of various embodiments of the present application does not indicate the execution sequence, which should be determined by the function and internal logic of the step, and shall not limit the implementation of the embodiments of the present application. The serial numbers of the foregoing embodiments of the present application are only for the purpose of description and do not imply a preference among the embodiments.

The above merely describes the embodiments of the present application, but the protection scope of the present application is not limited thereto. Any changes or replacements that can be easily thought by those skilled in the art within the scope of disclosure of the present application should fall within the protection scope of the present application.

What is claimed is:

1. A printer control method, comprising:

controlling a first acquisition device to acquire first detection information of a print head assembly of a printer, wherein the print head assembly comprises a first nozzle and a second nozzle, and the first detection information is configured to determine at least one of a position of the first nozzle or a position of the second nozzle;

performing at least one calibration on the print head assembly to align the first nozzle and the second nozzle based on the first detection information, wherein the calibration comprises: adjusting a position of the print head assembly based on a deviation of the print head assembly when the deviation exceeds a preset deviation range, wherein the deviation of the print head assembly is determined based on the at least one of a position of the first nozzle or a position of the second nozzle;

controlling the first acquisition device to acquire second detection information of the print head assembly after the calibration; and switching the printer to a ready state or resuming a printing task, when the second detection information indicates that the deviation of the print head assembly falls within the preset deviation range.

2. The control method of claim 1, wherein the first detection information is first image information, and the control method further comprises:

performing feature extraction on the first image information to obtain a position of a target nozzle and calibration point information of the target nozzle, wherein the target nozzle comprises at least one of the first nozzle or the second nozzle; and determining the deviation of the print head assembly based on the position of the target nozzle and the calibration point information of the target nozzle, wherein the deviation of the print head assembly comprises at least one of a deviation of the first nozzle or a deviation of the second nozzle, wherein the deviation of the first nozzle is a deviation between a position of the first nozzle and calibration point information of the first nozzle; and the deviation of the second nozzle is a deviation between a position of the second nozzle and calibration point information of the second nozzle.

3. The control method of claim 2, wherein the position of the first nozzle is a three-dimensional position, and the position of the second nozzle is a three-dimensional position;

the feature extraction represents extracting a feature of the first detection information based on at least one of template matching, edge detection, and a deep learning algorithm to obtain a three-dimensional position of the target nozzle and the calibration point information of the target nozzle; and adjusting the position of the print head assembly comprises:

adjusting the position of the print head assembly based on a compensation parameter corresponding to the deviation of the print head assembly, and updating a coordinate reference of the print head assembly when the adjusting the position of the print head assembly has been completed, wherein the compensation parameter is determined based on a deviation of a true center of the target nozzle, and the deviation of the true center of the target nozzle is determined based on the three-dimensional position of the target nozzle and the calibration point information of the target nozzle.

4. The control method of claim 1, wherein the control method further comprises:

controlling the print head assembly to print an initial print sample; and correcting a printing path of the print head assembly based on a dimensional deviation of a printed initial print sample, and aligning the first nozzle and the second nozzle in the print head assembly.

5. The control method of claim 1, wherein the control method further comprises:

in response to detecting a nozzle switching instruction, controlling the first acquisition device to acquire third detection information of an active nozzle, wherein the active nozzle is selected from the first nozzle or the second nozzle;

switching another nozzle of the first nozzle or the second nozzle to the active nozzle;

controlling the first acquisition device to acquire fourth detection information of the active nozzle; and performing at least one calibration on the active nozzle based on the third detection information and the fourth detection information.

6. The control method of claim 5, wherein the control method further comprises:

performing one calibration on the active nozzle based on the third detection information and the fourth detection information;

controlling the first acquisition device to acquire next fourth detection information of the active nozzle; and switching the printer to the ready state or resuming the printing task, when the next fourth detection information indicates that a deviation of the active nozzle falls within the preset deviation range.

7. The control method of claim 1, wherein the control method further comprises:

controlling the print head assembly of the printer to print a target outer wall set of a three-dimensional model, wherein the three-dimensional model comprises a plurality of outer wall sets and infill sets corresponding to the outer wall sets, the target outer wall set is one of the plurality of outer wall sets and comprises at least two layers of outer walls, and each of the infill sets comprises one or more layers of infill; and controlling the print head assembly to print a target infill set corresponding to the target outer wall set, wherein a total height of the one or more layers of infill in the target infill set is the same as a total height of the at least two layers of outer walls in the target outer wall set, and the number of layers contained in the target infill set is less than the number of layers contained in the target outer wall set.

8. A printer control method, comprising:

in response to a first calibration instruction, controlling a distance sensor in a first acquisition device to acquire first detection information of a print head assembly of a printer, wherein the print head assembly comprises: a first nozzle and a second nozzle; and the first detection information comprises at least one of a first distance in a Z direction between a target nozzle in the print head assembly and a printing platform of the printer, or a first distance in an X/Y direction between the first nozzle and the second nozzle in the print head assembly, wherein the target nozzle comprises at least one of the first nozzle or the second nozzle;

performing at least one calibration on the print head assembly to align the first nozzle and the second nozzle based on the first detection information, comprising: when a deviation in the Z direction corresponding to the first distance in the Z direction exceeds a preset deviation range in the Z direction, adjusting a position of the print head assembly in the Z direction based on the deviation in the Z direction; and/or when a deviation in the X/Y direction corresponding to the first distance in the X/Y direction exceeds a preset deviation range in the X/Y direction, adjusting a position of the print head assembly in the X/Y direction based on the deviation in the X/Y direction;

controlling the distance sensor in the first acquisition device to acquire second detection information of the print head assembly after the calibration, wherein the second detection information comprises at least one of a second distance in the Z direction between the target nozzle in the print head assembly and the printing platform of the printer, or a second distance in the X/Y direction between the first nozzle and the second nozzle in the print head assembly; and switching the printer to a ready state or resuming a printing task, when a deviation in the Z direction corresponding to the second distance in the Z direction falls within the preset deviation range in the Z direction, and a deviation in the X/Y direction corresponding to the second distance in the X/Y direction falls within the preset deviation range in the X/Y direction.

9. The control method of claim 8, wherein the distance sensor comprises: a first eddy current sensor disposed on the print head assembly, and a second eddy current sensor disposed on the printing platform, and the control method further comprises:

acquiring the first distance in the Z direction between the target nozzle and the printing platform through the first eddy current sensor, when the first calibration instruction is to calibrate the print head assembly in the Z direction; or acquiring the first distance in the X/Y direction between the first nozzle and the second nozzle through the second eddy current sensor, when the first calibration instruction is to calibrate the print head assembly in the X/Y direction.

10. The control method of claim 8, wherein the deviation in the Z direction is a deviation between the first distance in the Z direction and a first standard distance corresponding to the first calibration instruction; and the deviation in the X/Y direction is a deviation between the first distance in the X/Y direction and a second standard distance, wherein the second standard distance is a distance between the first nozzle and the second nozzle when being aligned in the X/Y direction.

11. The control method of claim 8, wherein the control method further comprises:

adjusting a position of the target nozzle in the Z direction and a coordinate reference of the target nozzle in the Z direction based on a compensation parameter in the Z direction corresponding to the deviation in the Z direction, wherein the compensation parameter in the Z direction is determined based on the deviation in the Z direction and a preset first mapping relationship; and adjusting the position of the print head assembly in the X/Y direction and a coordinate reference of the print head assembly in the X/Y direction based on a compensation parameter in the X/Y direction corresponding to the deviation in the X/Y direction, wherein the compensation parameter in the X/Y direction is determined based on the deviation in the X/Y direction and a preset second mapping relationship.

12. The control method of claim 8, wherein the first acquisition device comprises a first image sensor disposed on a body of the printer, and the control method further comprises:

in response to a second calibration instruction, controlling the print head assembly to print a calibration pattern;

controlling the first image sensor to acquire second image information containing the calibration pattern; and when a printing deviation determined based on the second image information exceeds a deviation range, adjusting a position of the print head assembly based on the second image information until the printing deviation falls within the deviation range.

13. The control method of claim 12, wherein the calibration pattern comprises a first calibration pattern and a second calibration pattern, and the control method further comprises:

controlling the first nozzle in the print head assembly to print the first calibration pattern, and controlling the second nozzle in the print head assembly to print the second calibration pattern;

acquiring the first calibration pattern and the second calibration pattern through the first image sensor to obtain the second image information; and determining a printing deviation of the print head assembly in a first direction corresponding to a first parallel line segment group in the second image information based on the first parallel line segment group, wherein two parallel lines in the first parallel line segment group are located in the first calibration pattern and the second calibration pattern respectively.

14. The control method of claim 13, wherein the calibration pattern further comprises a third calibration pattern and a fourth calibration pattern, and the control method further comprises:

when the adjusting the position of the print head assembly has been completed, controlling the first nozzle in the print head assembly to print the third calibration pattern, and controlling the second nozzle in the print head assembly to print the fourth calibration pattern;

acquiring the third calibration pattern and the fourth calibration pattern through the first image sensor to obtain third image information;

determining a printing deviation of the print head assembly in a second direction corresponding to a second parallel line segment group in the third image information based on the second parallel line segment group, wherein the first direction and the second direction are different; and controlling the calibration of the print head assembly to be terminated based on the printing deviation in the first direction and the printing deviation in the second direction.

15. The control method of claim 12, wherein the first acquisition device further comprises a laser sensor and a second image sensor disposed on the print head assembly, and the control method further comprises:

emitting laser light toward a printed calibration pattern through the laser sensor; and performing image acquisition on a laser light-exposed calibration pattern through the second image sensor to obtain the second image information.

16. The control method of claim 12, wherein the control method further comprises:

determining printing information of the print head assembly based on the second image information, wherein the printing information comprises at least one of a printing height, in the Z direction, of a target line in the second image information, or a printing length, in the X/Y direction, of the target line in the second image information; and adjusting the position of the print head assembly and a coordinate reference of the print head assembly based on a printing deviation corresponding to the printing information, wherein the printing deviation comprises at least one of a deviation between the printing height in the Z direction and a theoretical height of the calibration pattern in the Z direction, or a deviation between the printing length in the X/Y direction and a theoretical length of the calibration pattern in the X/Y direction.

17. The control method of claim 8, wherein the first acquisition device comprises a second image sensor disposed on the print head assembly, and the control method further comprises:

in response to a third calibration instruction, controlling the print head assembly to move;

when the print head assembly is in a state of motion, controlling the second image sensor to acquire a motion video of the print head assembly in the state of motion; and when a motion deviation determined based on the motion video exceeds a deviation range, adjusting a position of the print head assembly based on the motion video until the motion deviation falls within the deviation range.

18. The control method of claim 17, wherein the control method further comprises:

controlling the second image sensor to acquire target encoding information from a visual encoding plate below the print head assembly, and setting at least two frames of images containing the target encoding information as the motion video, wherein the visual encoding plate is detachably arranged on the printing platform of the printer and comprises at least two pieces of encoding information; and the target encoding information is configured to calibrate a relative position between the print head assembly and the printing platform of the printer; and the adjusting the position of the print head assembly based on the motion video further comprises:

determining a motion trajectory of the print head assembly based on the target encoding information in the at least two frames of images in the motion video;

determining a motion deviation of the print head assembly based on the motion trajectory and a standard trajectory corresponding to the third calibration instruction; and adjusting the position of the print head assembly and a coordinate reference of the print head assembly based on a motion compensation parameter corresponding to the motion deviation.

19. A printer, comprising: a first acquisition device, a print head assembly, a processor, and a memory, wherein the print head assembly comprises a first nozzle and a second nozzle; and the memory stores thereon a computer program executable on the processor, and the processor, when executing the computer program, controls the print head assembly to, in response to a control system of the printer, perform the following operations:

controlling the first acquisition device to acquire first detection information of the print head assembly of the printer, wherein the first detection information is configured to determine at least one of a position of the first nozzle or a position of the second nozzle;

performing at least one calibration on the print head assembly to align the first nozzle and the second nozzle based on the first detection information, wherein the calibration comprises: adjusting a position of the print head assembly based on a deviation of the print head assembly when the deviation exceeds a preset deviation range, wherein the deviation of the print head assembly is determined based on the at least one of a position of the first nozzle or a position of the second nozzle;

controlling the first acquisition device to acquire second detection information of the print head assembly after the calibration; and switching the printer to a ready state or resuming a printing task, when the second detection information indicates that the deviation of the print head assembly falls within the preset deviation range.

20. The printer of claim 19, wherein the printer is further configured to:

in response to a first calibration instruction, control a distance sensor in the first acquisition device to acquire the first detection information of the print head assembly of the printer, wherein the first detection information comprises at least one of a first distance in a Z direction between a target nozzle in the print head assembly and a printing platform of the printer, or a first distance in an X/Y direction between the first nozzle and the second nozzle in the print head assembly, wherein the target nozzle comprises at least one of the first nozzle or the second nozzle;

perform at least one calibration on the print head assembly based on the first detection information, comprising: when a deviation in the Z direction corresponding to the first distance in the Z direction exceeds a preset deviation range in the Z direction, adjusting a position of the print head assembly in the Z direction based on the deviation in the Z direction; and/or when a deviation in the X/Y direction corresponding to the first distance in the X/Y direction exceeds a preset deviation range in the X/Y direction, adjusting a position of the print head assembly in the X/Y direction based on the deviation in the X/Y direction;

control the distance sensor in the first acquisition device to acquire second detection information of the print head assembly after the calibration, wherein the second detection information comprises at least one of a second distance in the Z direction between the target nozzle in the print head assembly and the printing platform of the printer, or a second distance in the X/Y direction between the first nozzle and the second nozzle in the print head assembly; and switch the printer to the ready state or resume the printing task, when a deviation in the Z direction corresponding to the second distance in the Z direction falls within the preset deviation range in the Z direction, and a deviation in the X/Y direction corresponding to the second distance in the X/Y direction falls within the preset deviation range in the X/Y direction.

* * * * *